(12) United States Patent
Ishikawa

(10) Patent No.: US 7,330,581 B2
(45) Date of Patent: Feb. 12, 2008

(54) IMAGE DEFECT INSPECTION METHOD, IMAGE DEFECT INSPECTION APPARATUS AND APPEARANCE INSPECTION APPARATUS

(75) Inventor: Akio Ishikawa, Hachioji (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 876 days.

(21) Appl. No.: 10/674,654

(22) Filed: Sep. 29, 2003

(65) Prior Publication Data
US 2004/0062432 A1 Apr. 1, 2004

(30) Foreign Application Priority Data
Oct. 1, 2002 (JP) ............................ 2002-288375
Jun. 30, 2003 (JP) ............................ 2003-188209

(51) Int. Cl.
*G06K 9/00* (2006.01)
(52) U.S. Cl. ...................... 382/145; 382/149; 382/168; 382/169; 382/172
(58) Field of Classification Search ................ 382/145, 382/149, 168, 169, 172
See application file for complete search history.

(56) References Cited

U.S. PATENT DOCUMENTS

| 4,868,651 | A | * | 9/1989 | Chou et al. | ................. | 378/98.7 |
| 6,137,541 | A | * | 10/2000 | Murayama | ................... | 348/673 |
| 6,993,183 | B2 | * | 1/2006 | Inoue | ......................... | 382/170 |
| 2005/0013475 | A1 | * | 1/2005 | Levin et al. | ................. | 382/145 |

FOREIGN PATENT DOCUMENTS

| JP | 4-107946 | 4/1992 |
| JP | 4 107946 | 4/1992 |
| JP | 5-047886 | 2/1993 |
| JP | 5 47886 | 2/1993 |
| JP | 2002-022421 | 1/2002 |
| JP | 2002 22421 | 1/2002 |

OTHER PUBLICATIONS

Patent Abstract of Japan, Publication No. 04-107946, Published on Apr. 9, 1992, in the name of Taniguchi et al.
Patent Abstract of Japan, Publication No. 05-047886, Published on Feb. 26, 1993, in the name of Jingu.
Patent Abstract of Japan, Publication No. 2002-022421, Published on Jan. 23, 2002, in the name of Hikita et al.

* cited by examiner

*Primary Examiner*—Bhavesh M Mehta
*Assistant Examiner*—John B Strege
(74) *Attorney, Agent, or Firm*—Christie, Parker & Hale, LLP

(57) ABSTRACT

A new image defect inspection method and a new image defect inspection apparatus capable of being used for automatic setting of a threshold value for an appearance inspection apparatus with a high throughput have been disclosed. According to the image defect inspection method and the image defect inspection apparatus, cumulative frequencies of gray level differences of the corresponding parts of two images are calculated, converted cumulative frequencies are calculated by converting the cumulative frequencies so as to be linear with the gray level differences in a predetermined distribution, a straight line approximation to the converted cumulative frequencies is calculated, and a threshold value is determined from a predetermined cumulative frequency based on the calculated straight line approximation according to a predetermined calculation method. Because there holds a linear relationship between the converted cumulative frequencies and the gray level differences, the following process for determining a threshold value is facilitated.

29 Claims, 16 Drawing Sheets

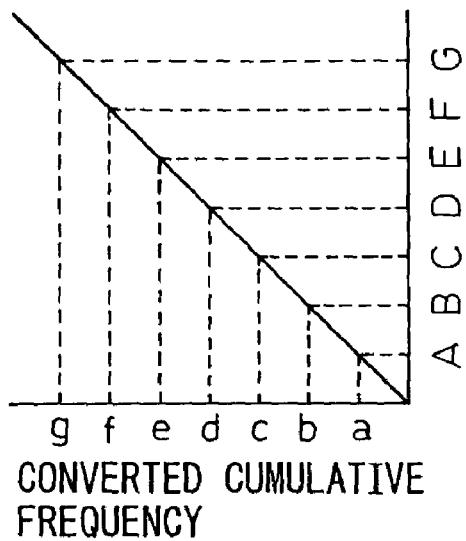
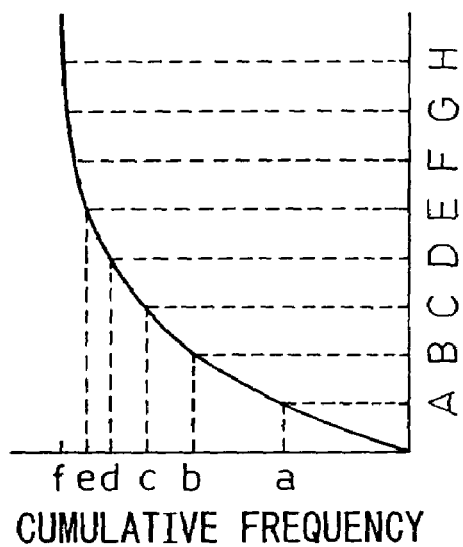
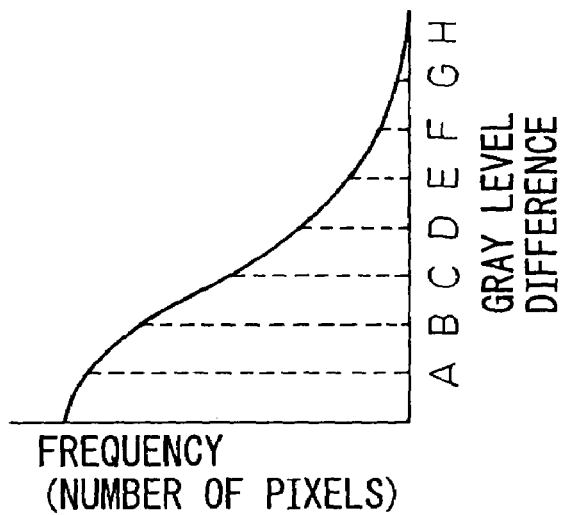

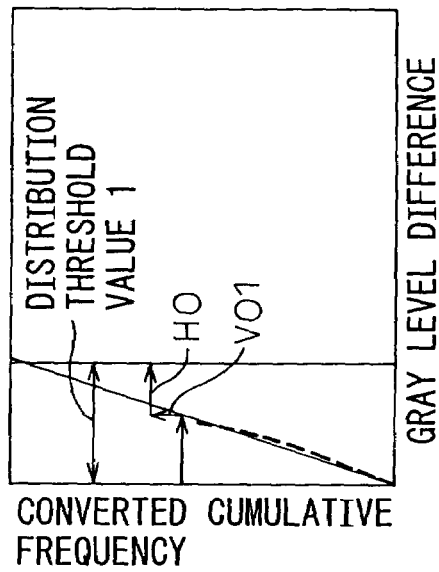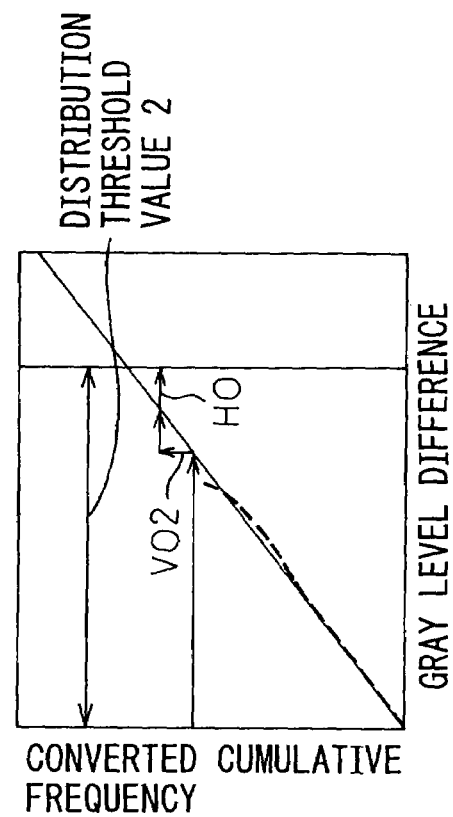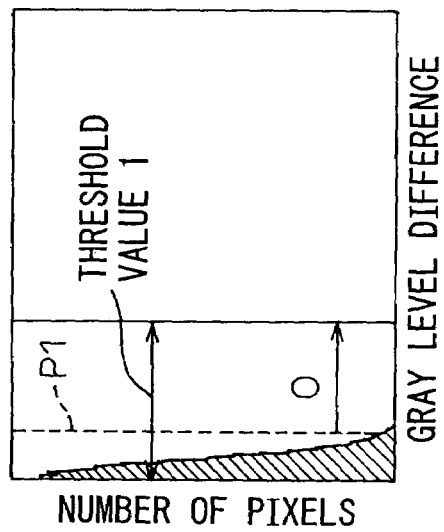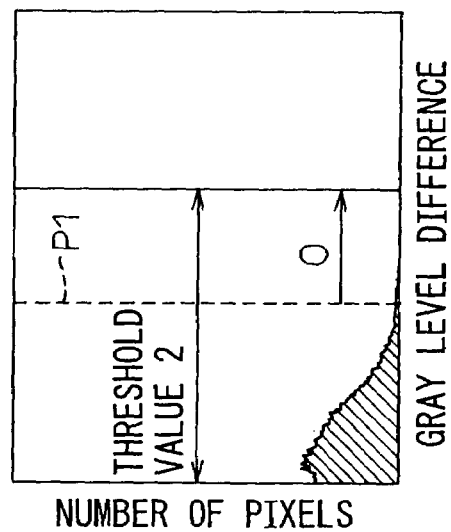

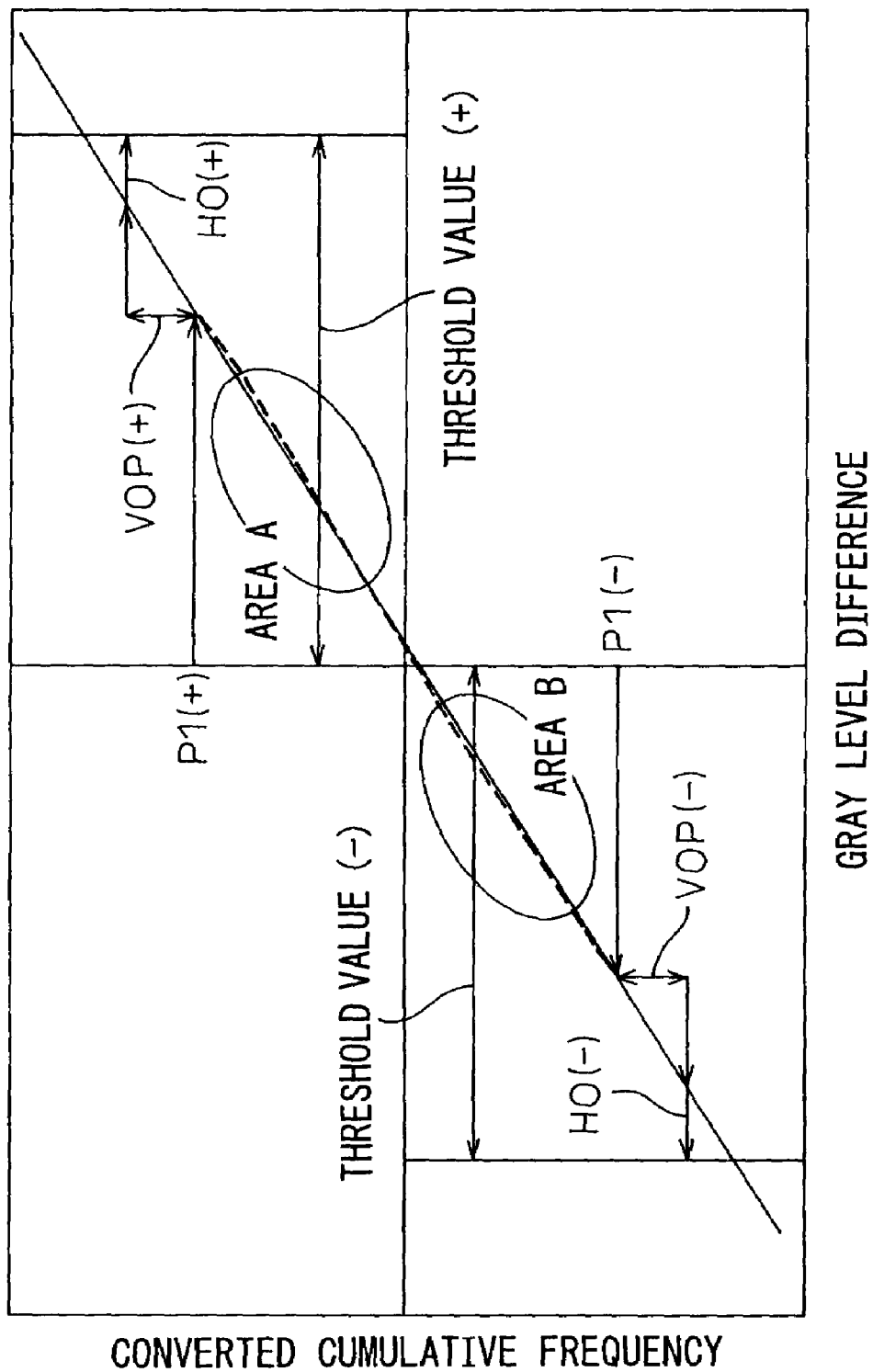

IMAGE DEFECT INSPECTION METHOD, IMAGE DEFECT INSPECTION APPARATUS AND APPEARANCE INSPECTION APPARATUS

CROSS-REFERENCE TO RELATED APPLICATION

This application claims priority of Japanese Patent Application Number 2002-288375, filed on Oct. 1, 2002, and Japanese Patent Application Number 2003-188209, filed on Jun. 30, 2003.

BACKGROUND OF THE INVENTION

The present invention relates to a defect inspection method, and an apparatus, for detecting the difference between corresponding signals, comparing the detected difference with a threshold value, and judging the part to be a defect when the difference is larger than the threshold value. More particularly, the present invention relates to an image defect inspection method, and an apparatus, for detecting the difference in gray level between corresponding parts of two images, comparing the detected gray level difference with a threshold value, and judging the part to be a defect when the gray level difference is larger than the threshold value, and also relates to an appearance inspection apparatus for detecting a defect in a semiconductor circuit pattern formed on a semiconductor wafer by using the method. Still more particularly, the present invention relates to a technique to determine a threshold value in accordance with a signal (image).

The object of the present invention relates to an image processing method, and to an apparatus for judging a part where the difference is large enough to be a defect by making a comparison between the corresponding parts of two images that should be essentially the same. Here, an appearance inspection apparatus (inspection machine), which detects a defect in a semiconductor circuit pattern formed on a semiconductor wafer in the semiconductor manufacturing process, is taken as an example but the present invention is not limited to this case. A general appearance inspection apparatus is a bright field inspection apparatus, in which the surface of an object is illuminated in the vertical direction and the image of the reflected light is captured, but a dark field inspection apparatus, which does not capture the illumination light directly, can also be used. In the case of a dark field inspection apparatus, the surface of an object is illuminated in an oblique direction or in the vertical direction and a sensor is arranged so as not to detect regularly reflected light and the dark field image of the surface of the object is obtained by sequentially scanning the part that is irradiated with illuminating light. Therefore, some dark field apparatuses may not use an image sensor, but the present invention is also applicable to them. As described above, the present invention is applicable to any image processing method and any apparatus as long as the method and the apparatus make a comparison between the corresponding parts of two images (signals) that should be essentially the same and judge a part where the difference is large to be a defect.

In the semiconductor manufacturing process, many chips (dies) are formed on a semiconductor wafer. Patterns are formed across several layers on each die. The completed die is electrically tested by a probe and a tester and if found defective, it is excluded from the assembling process. In the semiconductor manufacturing process, the yield is a very important factor and the result of the above-mentioned electrical test is fed back to the manufacturing process and used for the management of each process. However, the semiconductor manufacturing process consists of many processes and it takes a very long time before an electrical test is conducted after the manufacturing starts, therefore, when a process is found defective based on the electrical test result, many wafers are already in the middle of the process, and it is impossible to efficiently utilize the test result in order to improve the yield. Because of this, a pattern defect inspection is conducted in order to detect a defect by inspecting patterns formed in an intermediate process. If a pattern inspection test is conducted in some processes, among all of the processes, it is possible to detect a defect that appears after the previous inspection is conducted and the inspection result can be immediately reflected in the process management.

In an appearance inspection apparatus currently used, a semiconductor wafer is illuminated, the image of a semiconductor circuit pattern is optically captured and an image electric signal is generated, and the image electric signal is further converted into a multi-valued digital signal (digital gray level signal). Then, the difference signal (gray level difference signal) between the digital signal and the gray level signal of a reference pattern is generated and a part where the difference is larger than a fixed threshold value is judged to be a defect. The reference pattern is in general a neighboring die or a neighboring similar pattern. Then, a defect grouping process is carried out, in which the part that has been judged to be a defect is further inspected in detail, and whether it is a true defect that adversely affects the yield is judged. The defect grouping process requires a long time for processing because it is necessary to inspect the part that has been judged to be a defect in detail. Therefore, when a part is judged to be a defect or not, it is required to judge a true defect to be a defect without fail, and not to judge a part that is not a true defect to be a defect, if possible.

Therefore, setting of a threshold value is essential. If a threshold value is set to too small a value, the number of pixels to be judged to be a defect increases and it may happen that even a part that is not a true defect is judged to be a defect, and a problem occurs that the time required for the defect grouping process is lengthened. On the contrary, if a threshold value is set to too large a value, it may happen that even a part that is a true defect is judged to be nondefective, and a problem occurs that the inspection is insufficient.

In the conventional method for automatically determining a threshold value based on samples, a digital gray level signal of the pattern of a similar sample is generated in advance, a gray level difference signal is further generated, and a histogram of differences is created. Then, a variation reference difference, which is set by a fixed proportion of a part where the difference is large in the histogram, is obtained and a detection threshold value is calculated by adding a fixed difference thereto. This is because it is thought that a case where the variation in the distribution of differences is large actually brings about a problem, and an attempt is made to suppress the number of pixels to be judged to be a defect from increasing so much even in such a case. According to this method, the variation reference difference varies depending on samples, but the fixed difference to be added is constant, and does not vary depending on the samples, therefore, there is a problem that it is not possible to obtain a proper threshold value when the noise level changes.

In order to solve the above-mentioned problem, various methods for determining a threshold value have been proposed. For example, Japanese Unexamined Patent Publication (Kokai) No. 4-107946 has disclosed a method for determining a threshold value based on the statistic of gray level differences calculated at plural parts of a pattern. In concrete terms, the maximum value of the gray level difference is obtained for each part and a histogram of maximums is created. Then an initial value of an optimum threshold value is set based on the average and the standard deviation, and the optimum threshold value is determined by correcting the initial value based on the number of pixels to be detected as a defect. However, there are problems in this method that (1) it is necessary to measure samples in advance and that (2) it is necessary to make plural inspections. Moreover, although it is stated that a threshold value is most proper when the number of detected defects changes suddenly, no concrete method has been described for obtaining such a threshold value at which the number changes suddenly.

Japanese Unexamined Patent Publication (Kokai) No. 5-47886 has disclosed a method in which a curve approximation is obtained by the relationship between the gray level difference and the frequency and a gray level difference at which the curve approximation becomes zero is taken as an optimum threshold value. However, although the relationship between the gray level difference and the frequency is represented by a curve, the curve does not necessarily become zero, therefore, there may be a case where a curve approximation does not become zero. Moreover, there may be a case where even a straight line does not become zero depending on the value of its slope. Therefore, there may be a case where setting is impossible. Although it is stated that such a curve is easy to obtain, actually it is not possible to easily obtain the curve because of its dependency on the distribution of gray level differences, and a problem occurs that the processing time is lengthened.

Japanese Unexamined Patent Publication (Kokai) No. 2002-22421 has disclosed a method for carrying out an error probability conversion using the standard deviation. However, there are problems in this method that (1) because the standard deviation is directly calculated from gray level differences, a tremendous amount of calculation is required and the processing time is lengthened, and that (2) because an error probability value is used, instead of a gray level difference, for defect judgment, it is necessary to calculate an error probability value for each gray level difference and the processing time is lengthened. Moreover, because the standard deviation is used, this method is applicable only to a normal distribution, not to other distributions.

There are demands for automatic inspection of a semiconductor pattern and for automatic setting of a threshold value. In order to realize this, it is necessary to set an optimum threshold value by immediately processing detected gray level differences and make a judgment in identifying a defect based on the threshold value, and it is possible to automatically set a threshold value by automatically following the above-mentioned method. On the other hand, however, it is required to shorten the inspection time in order to improve throughput, and there are problems in the above-mentioned method that it is necessary to measure the samples plural times in advance, that the processing time is long, and therefore that this method is not suitable for automatic setting of a threshold value of an inspection apparatus with a high throughput.

Particularly in an actual inspection of a semiconductor pattern, the noise level differs depending on: the position in a die; the position of the die on a wafer; and the wafer, even when the same semiconductor pattern is formed thereon. Therefore, it is necessary to set an optimum threshold value by timely processing the detected gray level differences, but the above-mentioned method cannot meet the demand.

As described above, the conventional method for determining a threshold value cannot be actually applied to an appearance inspection apparatus capable of automatically setting a threshold value and having a high throughput.

Moreover, it has been assumed so far that gray levels of two images to be compared are distributed with the center being the same value and that the number of pixels, gray level difference between which is zero, is largest, but in an actual case, this is not assured and an inspection error results.

SUMMARY OF THE INVENTION

The first object of the present invention is to realize an image defect inspection method and an image defect inspection apparatus that are new and can be used for automatic setting of a threshold value of an appearance inspection apparatus with a high throughput.

The second object of the present invention is to realize an image defect inspection method and an image defect inspection apparatus, the error of which, caused by the deviation in two image distributions to be compared, is reduced.

In order to realize the first object described above, an image defect inspection method and an image defect inspection apparatus according to a first aspect of the present invention are characterized in that cumulative frequencies of gray level differences between the corresponding parts of two images are calculated, converted cumulative frequencies are calculated by converting the cumulative frequencies so as to be linear with the gray level differences in a predetermined assumed distribution, a straight line approximation is calculated, and a threshold value is determined from a predetermined cumulative frequency value based on the calculated straight line approximation according to a predetermined calculation method.

As the converted cumulative frequency is linear with the gray level difference, the following process for determining a threshold value is simplified and the processing time is short. Therefore, if this method is used to automatically determine a threshold value in accordance with a pattern, the throughput is lowered only slightly.

Moreover, if conversion from the cumulative frequency into the converted cumulative frequency is carried out using a conversion table, the time required for conversion will be short.

Moreover, it is not necessary to calculate a threshold value from all of the gray level differences but only from some gray level differences sampled with a predetermined density, and thus the processing time can be reduced.

A threshold value is determined, for example, as a threshold value that is the gray level difference of a point corresponding to a predetermined cumulative frequency value on a straight line approximation plus a predetermined gray level difference. In this way, it is possible to determine a threshold value without the influence of a gray level difference corresponding to a defect. The gray level difference corresponding to a defect varies considerably according to the extent of the defect. Therefore, if the gray level difference corresponding to a defect is included in a statistical process, the variation is enlarged accordingly. A judgment in identifying a defect should be made without being affected by the extent of the defect and therefore it is desirable to set a threshold value without any influence of a defective part. If a gray level difference corresponding to a defect is included in the gray level differences to be processed, converted cumulative frequencies are approximated to a straight line to the extent of a certain gray level difference, and the line is shifted to a part where gray level differences are large beyond the gray level difference, and a step-formed graph is obtained as a result. Therefore, if the converted cumulative frequencies are approximated to a straight line with the shifted part being excluded, it is possible to obtain a normal distribution of gray level differences without a defect, that is, an exact noise level, and set a threshold value properly.

It is possible to use several distributions such as a normal distribution, a Poisson distribution, a t distribution, an exponential distribution, a Weibull distribution and a chi-square distribution.

For application of an optimum distribution, it is possible to: calculate each correlation coefficient between gray level differences and plural kinds of distributions and use a threshold value determined by a distribution that has the largest correlation coefficient; calculate plural individual threshold values for plural kinds of distributions and calculate a threshold value by averaging the plural individual threshold values; and calculate a threshold value as a weighted average of plural individual threshold values weighted by plural correlation coefficients. It is possible to obtain a correlation coefficient by, for example, calculating converted cumulative frequencies of plural kinds of distributions and straight line approximations and by calculating the difference between the converted cumulative frequencies and the straight line approximations.

The gray level difference can be positive- or negative-signed data or absolute-value data. In the case of absolute-value data, the absolute-value data is obtained by correcting signed data using the average or the like of the positive- or negative-signed data, and the absolute-value data is compared with a single threshold value. In the case of signed data, two threshold values for the positive and negative data are determined.

A threshold value is automatically determined for an image pattern to be inspected for a defect, and a judgment in identifying a defect in the image pattern is made by using the determined threshold value.

If the above-mentioned image defect inspection method or apparatus is used in an appearance inspection apparatus for detecting a defect of a semiconductor circuit pattern formed on a semiconductor wafer, it is possible to realize a semiconductor pattern appearance inspection apparatus capable of automatically setting a threshold value in accordance with the noise level of a pattern and having a high throughput.

In order to realize the above-mentioned second object, an image defect detection method and an image defect detection apparatus according to a second aspect of the present invention are characterized in that the average of positive- or negative-signed gray level differences is calculated, the signed gray level differences are corrected with the average and signed corrected gray level differences are calculated, absolute-value corrected gray level differences without a sign are calculated from the signed corrected gray level differences, and the absolute-value corrected gray level differences are compared with the threshold value.

In order to realize the above-mentioned second object, an image defect detection method and an image defect detection apparatus according to a third aspect of the present invention are characterized in that cumulative frequencies are calculated from positive- or negative-signed gray level differences for both positive and negative areas, two positive and negative threshold values are determined for both positive and negative areas from the cumulative frequencies according to a predetermined calculation method, half of the difference between the positive and negative threshold values is determined as a corrected threshold value, the gray level differences are corrected with the average of the two positive and negative threshold values to calculate the absolute-value corrected gray level differences, an absolute-value threshold value is calculated from the two positive and negative threshold values, and the absolute-value corrected gray level differences are compared with the absolute-value threshold value.

BRIEF DESCRIPTION OF THE DRAWINGS

The features and advantages of the invention will be more clearly understood from the following description taken in conjunction with the accompanying drawings, wherein:

FIG. 5A to FIG. 5C are diagrams that illustrate a process for calculating converted cumulative frequencies;

FIG. 7A to FIG. 7D are diagrams that show changes in detection threshold value in accordance with how widespread the distribution of an image is (noise level);

FIG. 11 is a diagram that illustrates the setting of two positive and negative threshold values when the object is the signed gray level differences in the third embodiment of the present invention.

DESCRIPTION OF THE PREFERRED EMBODIMENTS

Figure 1:
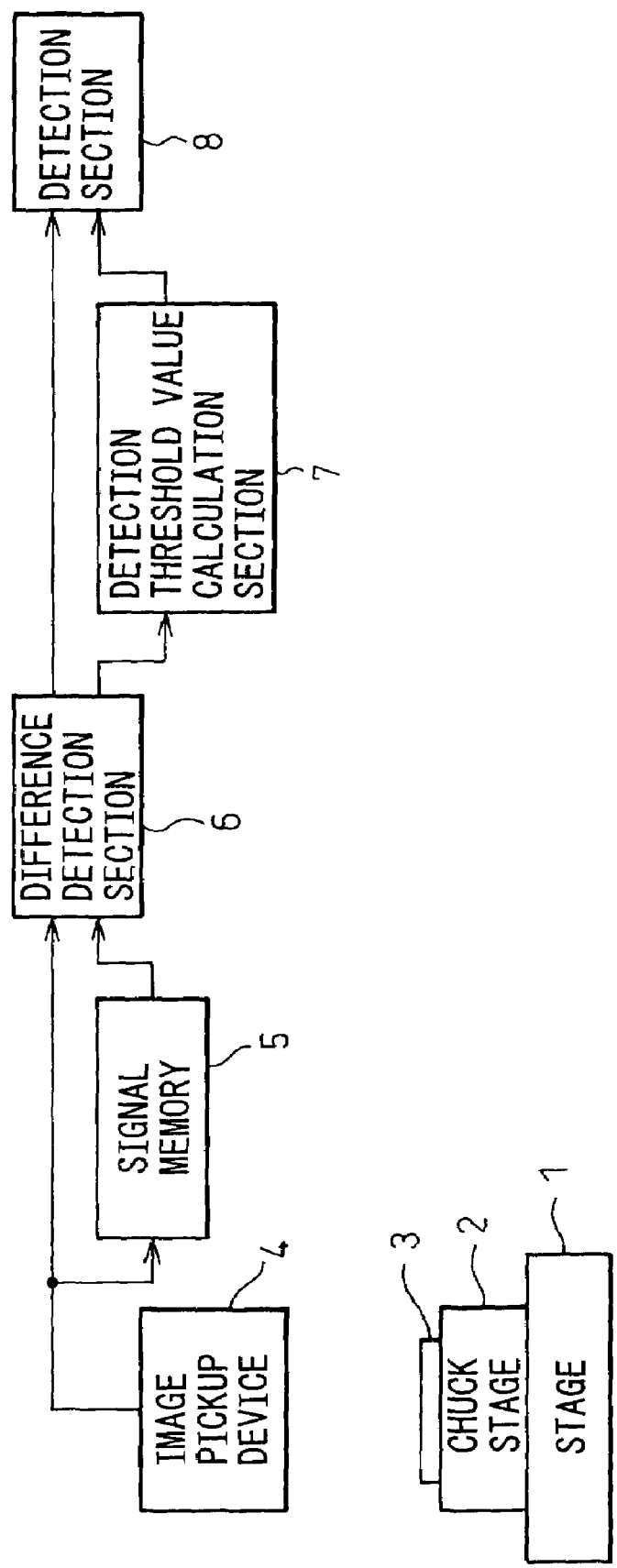
FIG. 1 is a block diagram that shows the general configuration of a semiconductor pattern appearance inspection apparatus according to a first embodiment of the present invention.

FIG. 1 is a block diagram that shows the general configuration of the semiconductor pattern appearance inspection apparatus according to the first embodiment of the present invention. As shown schematically, a chuck stage 2 is provided on the top surface of a stage 1 capable of freely moving in the two or three directions. On the chuck stage 2, a semiconductor wafer 3, which is an object to be inspected, is mounted and fixed thereto. An image pickup device 4, composed of a one- or two-dimensional camera or the like, is provided above the stage 1 and the image pickup device 4 generates the image signal of a pattern formed on the semiconductor wafer 3.

Figure 2:
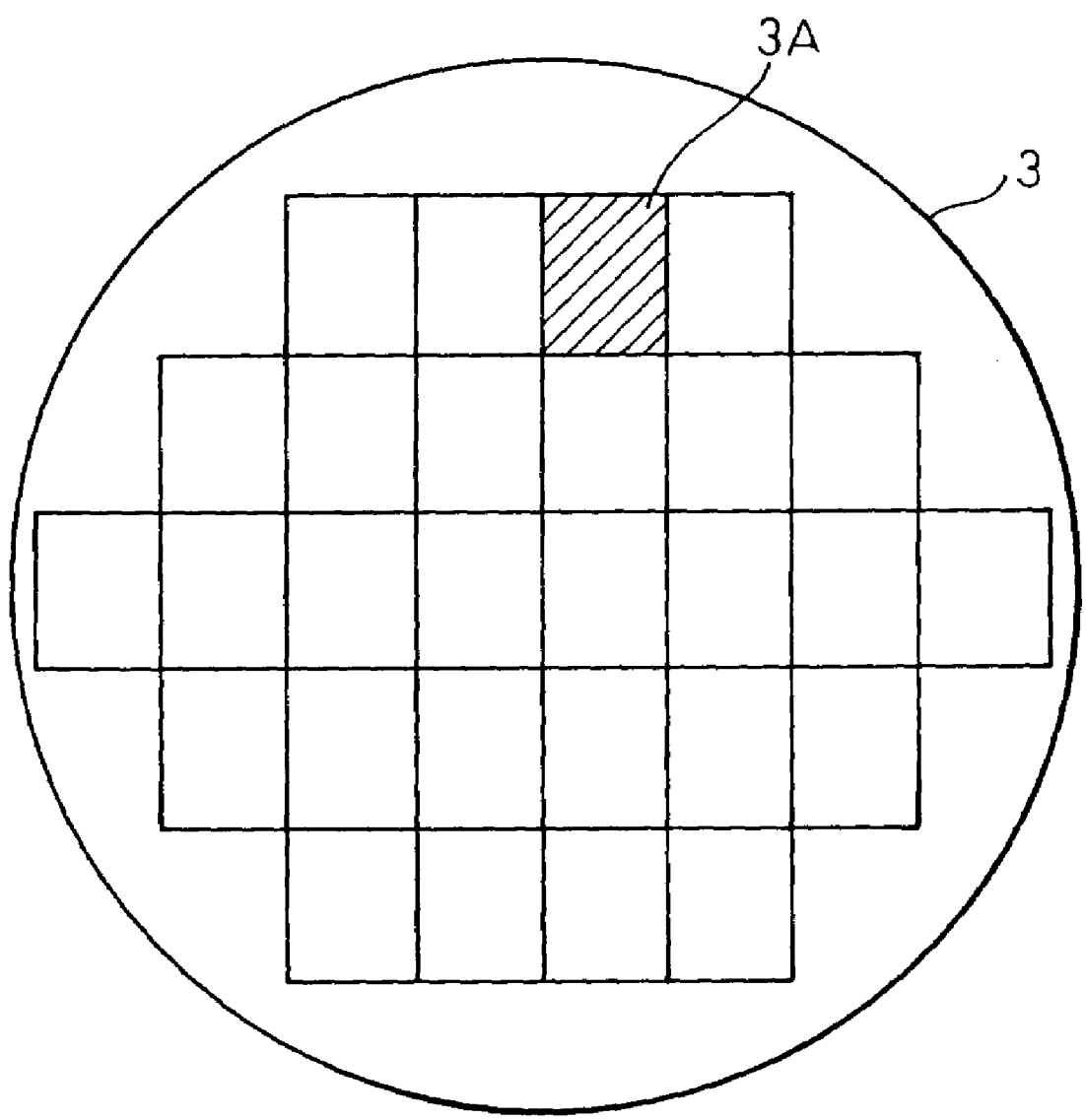
FIG. 2 is a diagram that shows an array of dies on a semiconductor wafer.

As shown in FIG. 2, on the semiconductor wafer 3, a plurality of dies 3A are arranged in a matrix form, repetitively in the X direction and the Y direction, respectively. As the same pattern is formed on each die, the images of corresponding parts of neighboring dies are generally compared. If there is no defect in each die, the gray level difference will be smaller than a threshold value, but if there is a defect in either die, the gray level difference will be larger than the threshold value (single detection). In order to determine which die is defective, a comparison is further made between one of the two dies and its neighboring die in the direction opposite to the other die, and if the gray level difference between the same parts exceeds the threshold value, the die is judged to be a defect (double detection).

The image pickup device 4 comprises a one-dimensional CCD camera, and the stage 1 is moved so that the camera relatively moves (scans) with respect to the semiconductor wafer 3 at a constant speed in the X or Y direction. After being converted into a multi-valued digital signal (gray level signal), the image signal is input to a difference detection section 6 and at the same time stored in a signal memory 5. When the gray level signal of the neighboring die is generated by scanning, the gray level signal of the die previously stored in the signal memory 5 is read in synchronization with this, and input to the difference detection section 6. In an actual case, processes such as a fine position alignment are performed, but a detailed description is not given here.

The gray level signals of the two neighboring dies are input to the difference detection section 6, and the difference between the two gray level signals (gray level signal) is calculated and input to a detection threshold value calculation section 7 and a detection section 8. The difference detection section 6 calculates the absolute-value of the gray level difference and outputs it as a gray level difference. The detection threshold value calculation section 7 determines a detection threshold value from the gray level difference and outputs it to the detection section 8. The detection section 8 compares the gray level difference with the determined threshold value and judges whether there exists a defect. In general, a semiconductor pattern has a different noise level depending on the type of a pattern, that is, the pattern of a memory cell, a logic circuit, a wiring section, an analog circuit, and so forth. The correspondence relationship between the part of a semiconductor and its type can be known from the design data. Therefore, for example, the detection threshold value calculation section 7 determines a threshold value for each part by carrying out a threshold value determining process and the detection section 8 makes a judgment using the threshold value determined for each part.

In the present embodiment, the signal memory 5 is provided to compare the images of neighboring dies on a semiconductor wafer, but it is also possible to generate a gray level difference by inputting the image signal of a reference specimen separately stored or the image signal generated from data such as CAD and, in such a case, the signal memory 5 can be dispensed with.

The general configuration of the appearance inspection apparatus in the first embodiment is described as above, but the present invention is characterized by the detection threshold value calculation section 7. Therefore, the process therein is described below by using FIG. 3 to FIG. 7.

Figure 3:
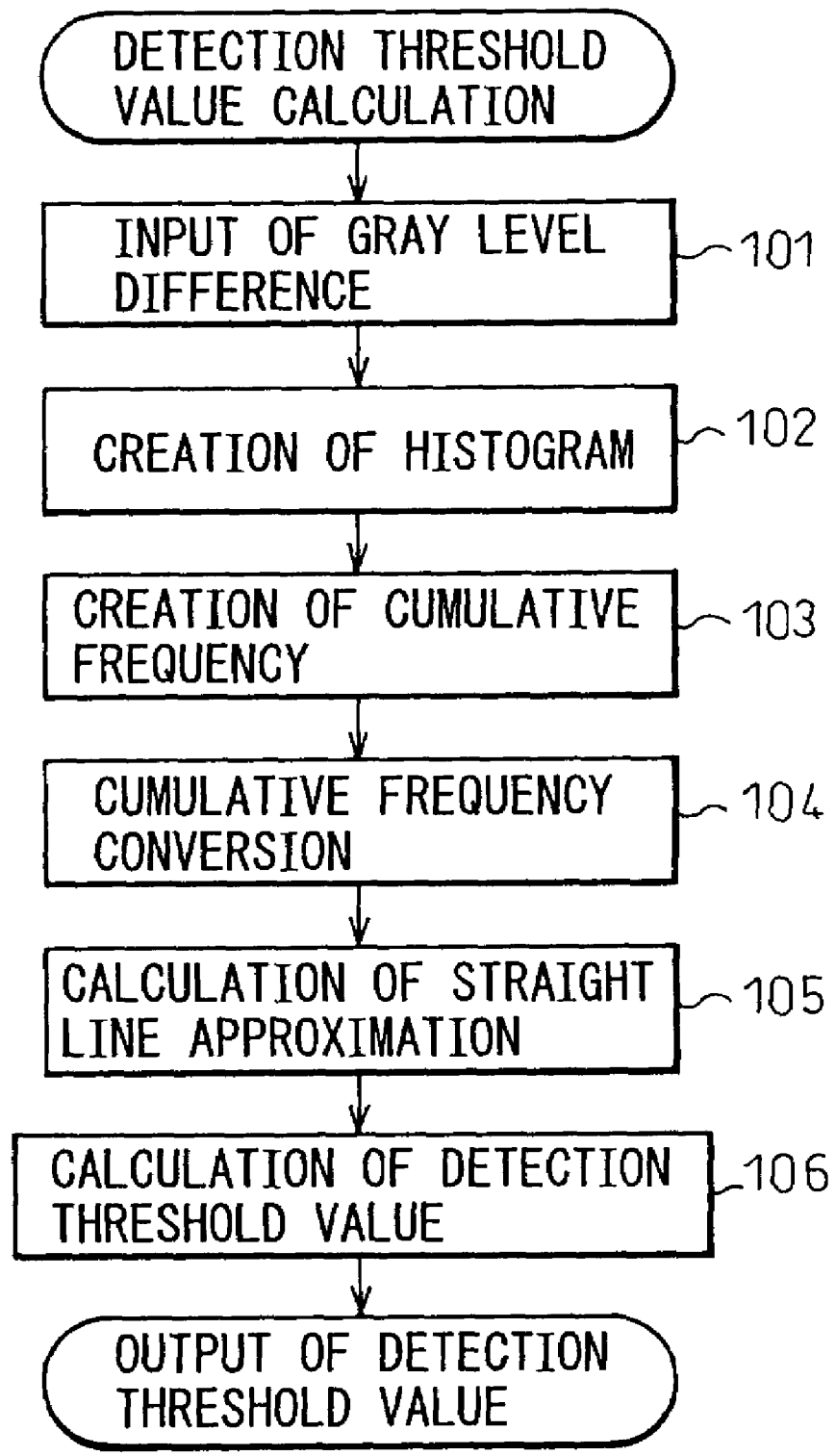
FIG. 3 is a flow chart of a process for determining a detection threshold value in the first embodiment.
Figure 4C:
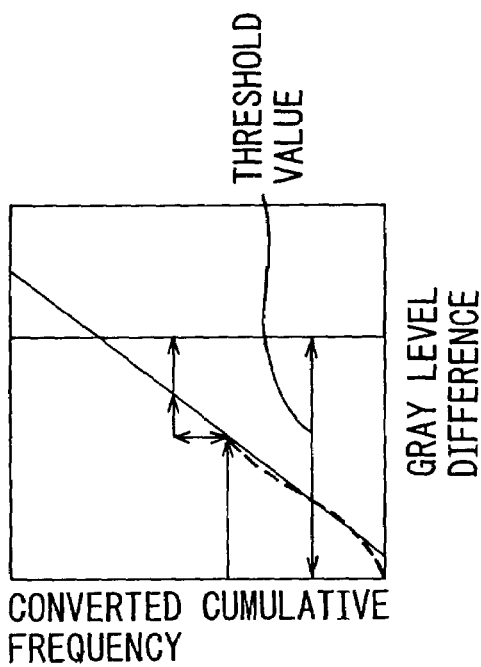
FIG. 4A to FIG. 4C are diagrams that illustrate a process for determining a detection threshold value.
Figure 4B:
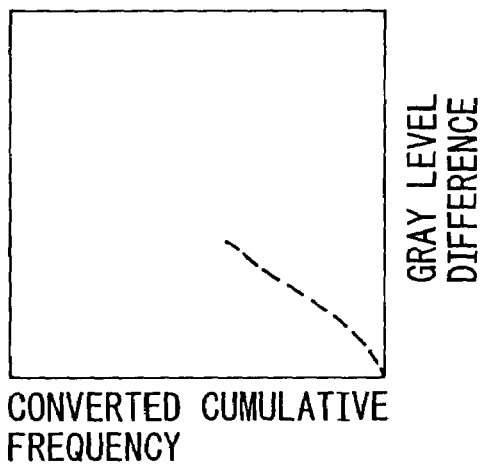
Figure 4A:
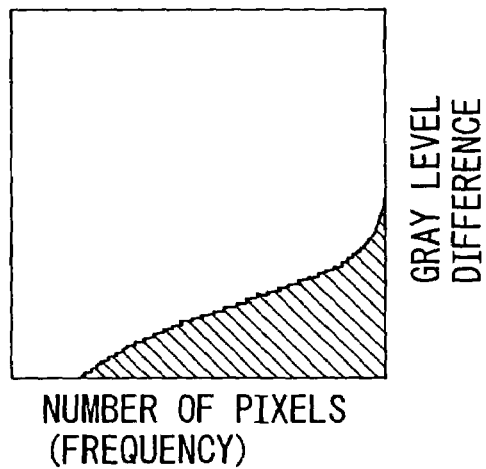

FIG. 3 is a flow chart that shows the detection threshold value calculation process in the detection threshold value calculation section 7, and FIG. 4A to FIG. 4C are diagrams that show the graphs created in the process. In step 101, the gray level difference of each pixel calculated in the difference detection section 6 is input. In step 102, a histogram of gray level differences is created as shown in FIG. 4A. When the number of target pixels is large, it is not necessary to use the gray level differences of all of the pixels in order to create a histogram, but it is possible to use the gray level differences of only some sampled pixels.

In step 103, the cumulative frequency of the gray level difference is created from the histogram. At this time, the cumulative probability may be created instead of the cumulative frequency, as will be described later.

In step 104, it is assumed that the distribution of gray level differences is represented by a distribution such as a normal distribution, a Poisson distribution or a chi-square distribution and, in accordance with the assumed distribution, the cumulative frequency is converted so that a linear relationship holds between the cumulative frequency and the gray level difference. If the frequencies of the gray level differences have a distribution as shown in FIG. 5A, the cumulative frequencies are represented by a monotonic increasing curve. If the curve is represented by probabilities by dividing each cumulative frequency by the total number of samples, curves having the same coefficient, which shows how widespread the distribution is, are identical. Next, the cumulative frequencies are converted so that a linear relationship holds between the cumulative frequency and the gray level difference. In concrete terms, if values a to f (in fact, a to h, although g and h are not shown) in FIG. 5B are converted so as to be proportional to values A to F (A to H), respectively, a graph shown in FIG. 5C is obtained, and if values A to G (A to H) are spaced, values a to g (a to h) are also spaced. The cumulative frequency converted in this manner is called the converted cumulative frequency. If it is assumed that the probability of a gray level difference is expressed by $f(t)$, the cumulative probability $F(t)$ (cumulative frequency/number of samples) is expressed by the following formula 1

$$F(t) = \int_0^t f(x)dx:$$

when the absolute-value of the gray level difference is used, or $$F(t) = \int_{-\infty}^t f(x)dx:$$

when the signed gray level difference is used.

Then, the cumulative probability is converted by $F^{-1}(t)$, which is the inverse of the cumulative probability $F(t)$. The converted cumulative frequencies obtained in this manner are expressed by a graph nearly equal to a straight line, as shown in FIG. 4B. Although the ordinate represents the cumulative frequency in the figure, it is possible to use the cumulative probability instead of the cumulative frequency.

As it requires an enormous amount of calculation to obtain the inverse of a cumulative probability function, a conversion table is prepared in advance in accordance with each distribution, and is used for conversion. It is not necessary to carry out the conversion for all the points of cumulative frequencies, but for only the number of points required to obtain a straight line approximation, which will be described later. It is possible to create an assumed distribution in advance by using reference samples or part of samples. When an assumed distribution is created from references, a histogram of gray level differences is first created for an area sufficiently larger than the range to be used to obtain a threshold value for inspection. At this time, it is necessary to: select dies without variations in color or an area containing such dies; obtain the average of signed gray level differences and correct so that the gray level difference is zero at the average; or to correct so that the gray level difference is zero when the probability is 50%. Then, it is desirable to reverse the corrected value with respect to zero and obtain the absolute-value of the gray level difference. After this, cumulative probabilities are obtained for the spaced gray level differences and thus the conversion table is created.

In step 105, a straight line approximation (y=ax+b) is calculated by the relationship between the gray level difference and the converted cumulative frequency. It is possible to obtain a straight line approximation by using the least squares method or the like, and it is also possible to obtain a straight line approximation in a simplified method in which a certain point among converted cumulative frequencies and the origin are connected by a straight line.

In step 106, a threshold value is determined by using the parameters a and b of the straight line approximation and sensitivity setting parameters (fixed values).

Figure 6A:
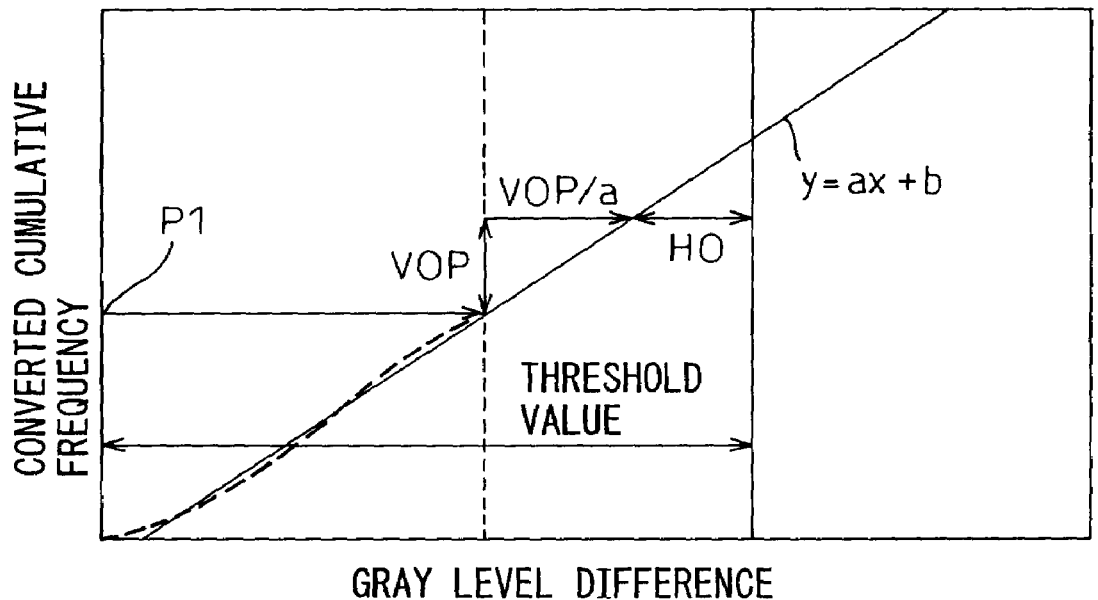
FIG. 6A and FIG. 6B are diagrams that illustrate a process for determining a threshold value from a graph of the gray level difference and the converted cumulative frequency.
Figure 6B:
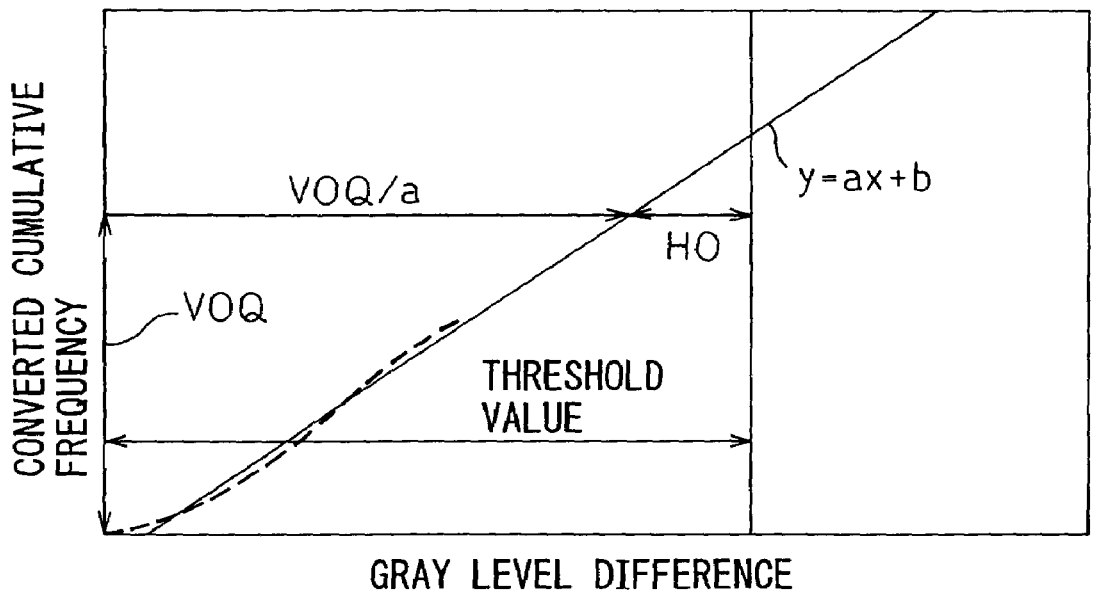

FIG. 6A and FIG. 6B are diagrams that illustrate an example of a method for determining a threshold value. In FIG. 6A, VOP and HO are set as fixed sensitivity setting parameters in a gray level difference-converted cumulative frequency graph, a point on the straight line, at which the cumulative frequency corresponding to the cumulative probability (p) is P1 (obtained by multiplying p by the number of samples), is obtained, then the threshold value is determined as the value of the gray level difference of the point, which has been shifted from the original point by the amount of VOP in the longitudinal direction and by the amount of HO in the horizontal direction. Therefore, the threshold value T is expressed as T=(P1−b+VOP)/a+HO.

As shown in FIG. 6B, the same result is obtained if P1+VOP is set as VOQ and the threshold value is determined as T=(VOQ−b)/a+HO.

FIG. 7A to FIG. 7D are diagrams that illustrate the validity of the threshold value determined in the manner described above. Here, a case where the noise level of an image is low and the range of the distribution of the gray level differences is narrow, as shown in FIG. 7A, and another case where the noise level of an image is high and the range of the distribution of the gray level differences is wide, as shown in FIG. 7C, are examined.

The gray level difference, at which the cumulative frequency corresponding to a fixed cumulative probability is P1, differs depending on how widespread the distribution is, as shown schematically. The threshold value is determined as the gray level difference plus the offset 0. The offset 0 is composed of a component that changes in accordance with how widespread the distribution is (that is, the slope a of a straight line) and a fixed component. When the slope a has a large value, that is, the image noise has a small value, the gray level difference, at which the cumulative frequency is P1, becomes smaller and the fixed offset component HO is constant, but the component VO1 that changes in accordance with the slope a of the offset also becomes smaller and, therefore, the threshold value becomes smaller, as shown in FIG. 7B. On the other hand, when the slope a has a small value, that is, the image noise has a large value, the gray level difference, at which the cumulative frequency is P1, becomes larger and the fixed offset component HO is constant, but the component VO2 that changes in accordance with the slope a of the offset also becomes larger, therefore, the threshold value becomes larger, as shown in FIG. 7D. As the offset component also changes in accordance with how widespread the distribution is (that is, the slope a of a straight line) in this way, it is possible to set a more proper threshold value. For example, because a fixed offset was used conventionally, many pseudo defects, which were not true defects, were detected when the image noise had a large value, but in the present invention, it is possible to suppress the number of pseudo defects to be detected because the slope a has a smaller value and, therefore, the threshold value becomes larger. Moreover, as all of these operations can be performed by linear calculations, only a short processing time is required for the operations. It is desirable to properly set the cumulative frequency P1 corresponding to the predetermined cumulative probability, the variable offset component and the fixed offset component based on the accumulated image data or the like. It is also desirable to: specify the image range in which the gray level differences are processed in order to set a threshold value in accordance with the types of circuits such as a memory cell array, a decoder circuit, an input/output circuit, or an operation unit based on the design data; and set a threshold value by properly setting the target range within each range and by applying the present invention.

Figure 8A:
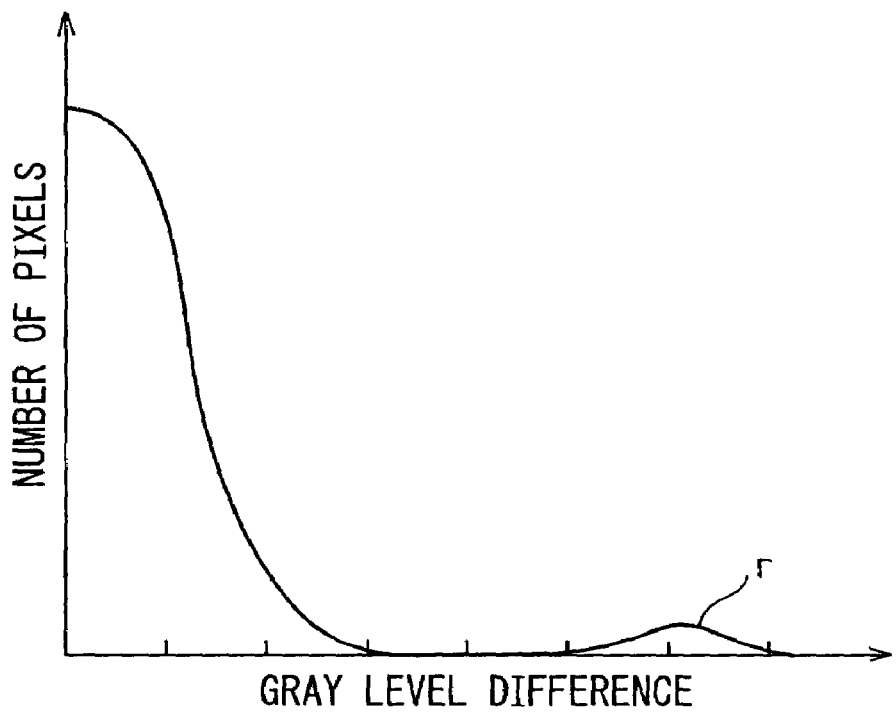
FIG. 8A and FIG. 8B are diagrams that illustrate the influence caused by a defective part.
Figure 8B:
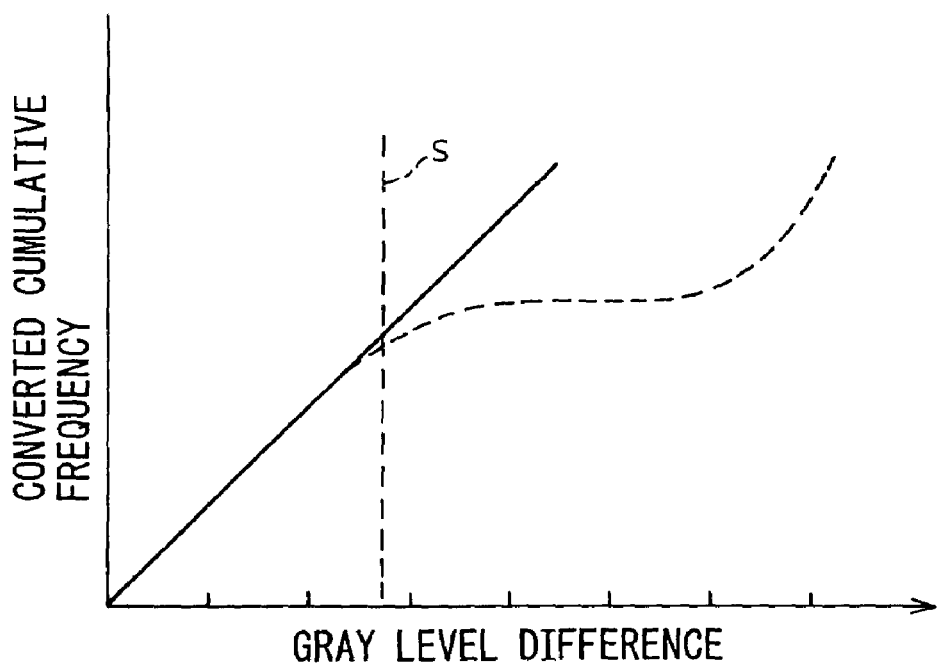

Here, the effect when an image includes a true defect is examined. When an image includes a true defect, the distribution (histogram) of gray level differences is as shown in FIG. 8A and a part r corresponding to a defect appears in an area where the gray level difference is large. FIG. 8B shows the converted cumulative frequency calculated from the histogram. The solid line indicates a graph when there is no defect, and the long dashed line indicates a graph when there is a defect as shown in FIG. 8A. As shown schematically, when there is a defect, the graph is step-formed because the straight line is shifted toward the area where the gray level difference is large, deviating from the straight line.

A gray level difference corresponding to a defect varies considerably depending on the extent of the defect. Therefore, if gray level differences are statistically processed including one corresponding to a defect, a significant variation results accordingly. A judgment in identifying a defect should be made based on settings without the influence of the extent of the defect, therefore, it is desirable to set a threshold value in accordance with only the noise level of a normal part not affected by a defective part. Therefore, the shifted part is excluded in obtaining a straight line approximation. In concrete terms, a straight line approximation is obtained from the data less than the value denoted by s in the figure. In this way, it is possible to accurately set a threshold value in accordance with the distribution of gray level differences without defective parts, that is, in accordance with the noise level.

In the first embodiment, it is assumed that the gray levels of two images to be compared are distributed with respect to the same center having the same value, that is, it is assumed that the number of pixels, between which the gray level difference is zero, is the largest, but in an actual case, the assumption is not assured. Therefore, in the second embodiment, a correction is made so that the centers of the distributions of gray levels of two images coincide with each other.

Figure 9:
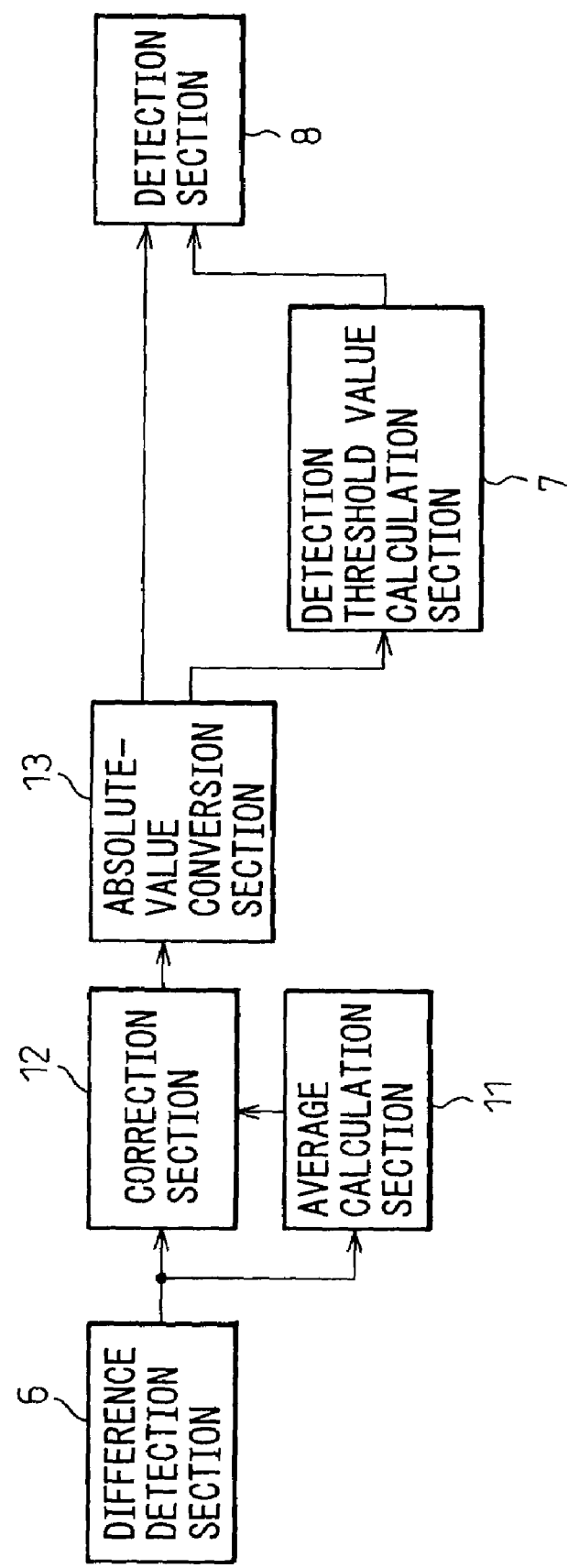
FIG. 9 is a block diagram that shows the general configuration of a semiconductor pattern appearance inspection apparatus according to a second embodiment of the present invention.

FIG. 9 is a diagram that shows the configuration of the part after the difference detection section 6 of the appearance inspection apparatus according to the second embodiment of the present invention. The other parts are the same as the first embodiment.

Here, the difference detection section 6 detects and outputs positive- or negative-signed gray level differences. An average calculation section 11 calculates the average of positive- or negative-signed gray level differences of all the pixels or of some sampled pixels. If the centers of the distributions of gray levels of two images coincide with each other, the average of gray level differences should be zero, therefore, the deviation from the calculated average zero indicates the deviation between the two distributions. A correction section 12 calculates signed corrected gray level differences by correcting the positive- or negative-signed gray level differences by the amount of the deviation from the average zero of the positive- or negative-signed gray level differences calculated by the average calculation section 11. The signed corrected gray level differences are distributed with respect to the center having the value of zero. An absolute-value conversion section 13 converts the signed corrected gray level differences into absolute-value corrected gray level differences without a sign, and outputs them to the detection threshold value calculation section 7 and the detection section 8. The processes in the detection threshold value calculation section 7 and the detection section 8 are the same as in the first embodiment.

It is also possible to obtain the gray level difference at which the cumulative frequency of two distributions is 50% and correct them so that they coincide with each other, instead of calculating the average of signed gray level differences for correction.

It is possible to correct the deviation between distributions of two images to be compared and reduce errors caused by the deviation in distribution by calculating the signed corrected gray level differences and the absolute-value corrected gray level differences for use in the later processes, as described in the second embodiment. It is effective to calculate the signed corrected gray level differences and the absolute-value corrected gray level differences for use in the later processes not only in the case of the second embodiment where, unlike in the first embodiment, a threshold value is not determined by calculating the converted cumulative frequencies and a straight line approximation in the detection threshold value calculation section 7 but also in a case where a threshold value is determined by another method or where a threshold value is already determined in advance.

In the first and second embodiments, a case where the gray level difference is expressed by an absolute-value is described, but it is also possible to determine a threshold value for the signed gray level difference. A case of the signed gray level difference is described in the following embodiment.

In the third embodiment of the present invention, the configuration is the same as that in the first embodiment shown in FIG. 1, but differs in that the difference detection section 6 detects and outputs positive- or negative-signed gray level differences and the detection threshold value calculation section 7 and the detection section 8 process the positive- or negative-signed gray level differences.

Figure 10A:
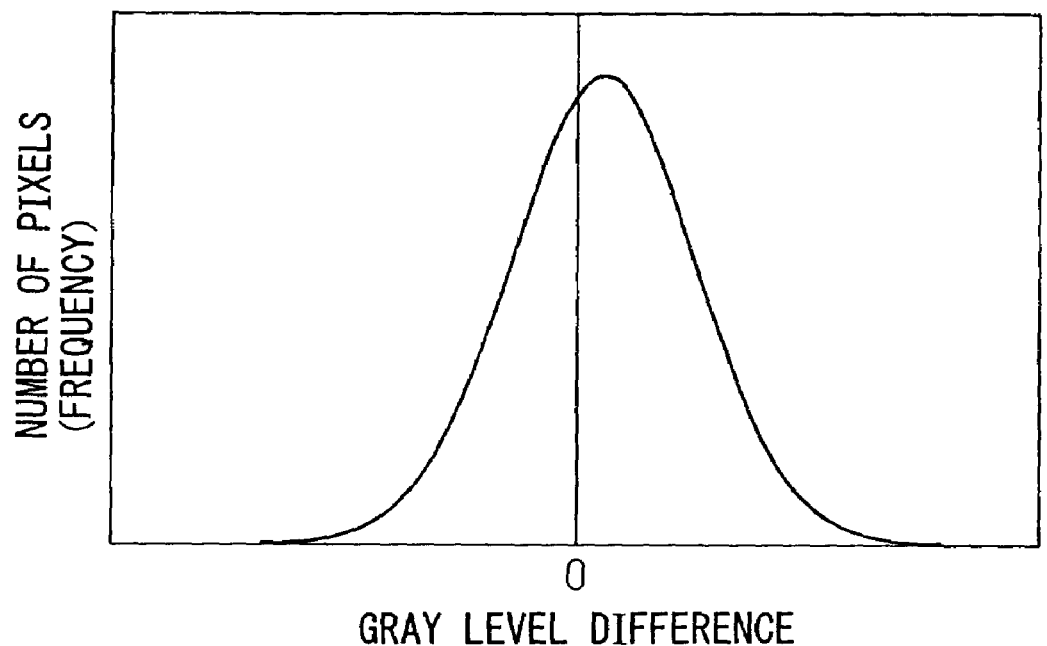
FIG. 10A and FIG. 10B are diagrams that show a histogram of gray level differences and the converted cumulative frequencies when the object is signed gray level differences in a third embodiment of the present invention.
Figure 10B:
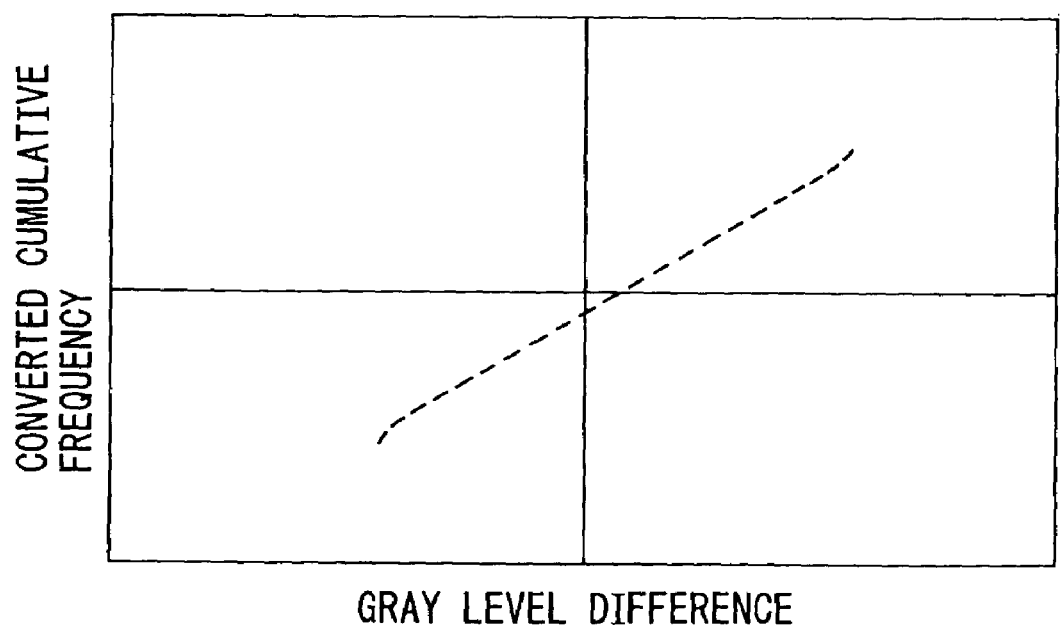

FIG. 10A and FIG. 10B, FIG. 11 and FIG. 12A to FIG. 12C are diagrams that show the process in the third embodiment, and FIG. 10A and FIG. 10B correspond to FIG. 4A and FIG. 4B, FIG. 11 corresponds to FIG. 4C, and FIG. 12A to FIG. 12C correspond to FIG. 5A to FIG. 5C.

The difference detection section 6 detects positive- or negative-signed gray level differences and the detection threshold value calculation section 7 determines two threshold values for the positive and negative areas, respectively, by performing the same process as the first embodiment for the data in the positive and negative areas, respectively.

First, a histogram of signed gray level differences as shown in FIG. 10A is created. The gray level difference of the maximum frequency deviates from zero. Next, the cumulative frequencies are converted into converted cumulative frequencies as shown in FIG. 10B so that there is a linear relationship between the cumulative frequency and the gray level difference. In this case, the graph does not pass through a point at which the gray level difference is zero and the cumulative frequency is 50%. Next, as shown in FIG. 11, the graph is approximated to a straight line to obtain a positive and a negative threshold values, respectively. P1 (+) and P1 (−), VOP (+) and VOP (−), and HO (+) and HO (−) can be identical or different between the positive and negative areas.

Moreover, the straight line approximations can be identical or different between the positive and negative areas. The positive threshold value Th (+) and the negative threshold value Th (−) obtained in this manner are set as a threshold value, respectively, and when a signal falls between the two threshold values it is judged to be normal, and if it falls outside the range, that is, if the gray level difference <TH (−) or Th (+)< the gray level difference, it is judged to be defective.

Therefore, the threshold values are two positive and negative values in this case.

Figure 12A:
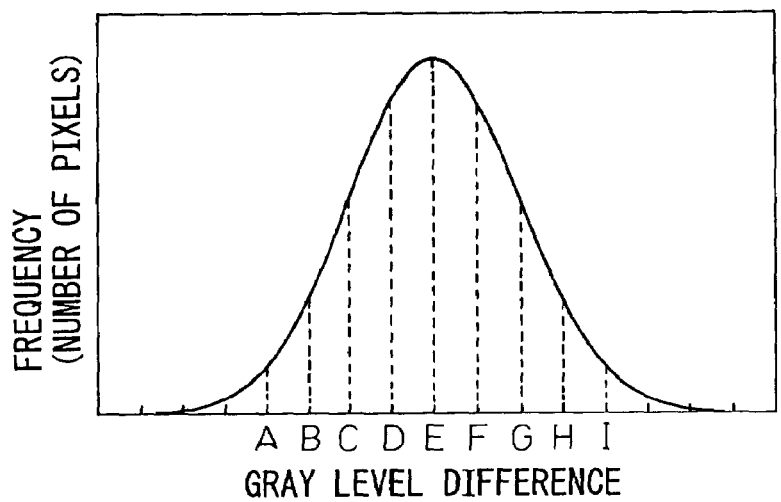
FIG. 12A to FIG. 12C are diagrams that illustrate a process when the object is the singed gray level differences in the third embodiment of the present invention.
Figure 12B:
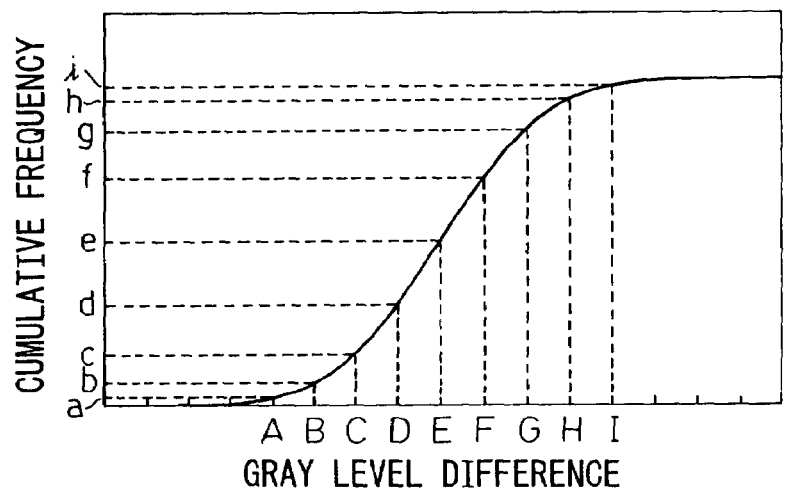
Figure 12C:
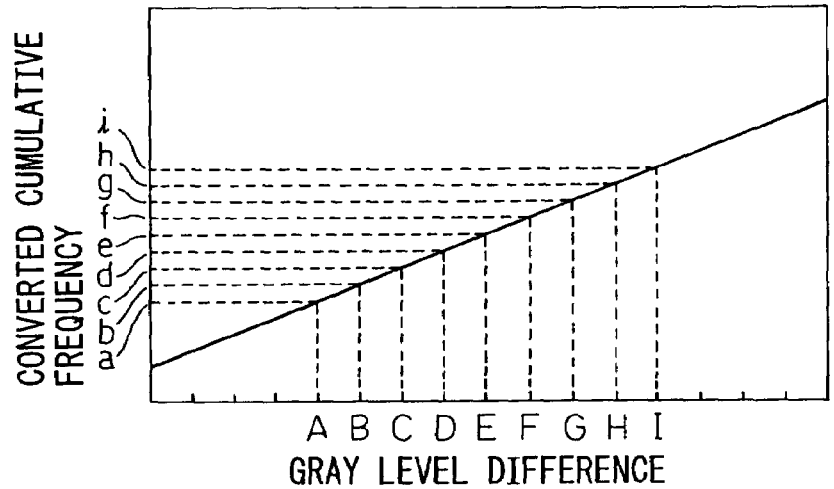

FIG. 12A to FIG. 12C are diagrams that illustrate the process described above, and FIG. 12A shows a frequency curve corresponding to a histogram of signed gray level differences. Reference symbols A to I show spaced gray level differences. Reference symbol E should correspond to the gray level difference zero, but in actual fact, there is a deviation corresponding to the amount of the average of gray level differences. FIG. 12B shows a cumulative frequency curve of signed gray level differences. The gray level difference E corresponds to the cumulative frequency 0.5, but in actual fact, there is a deviation. FIG. 12C shows the converted cumulative frequencies obtained by converting cumulative frequencies a to i corresponding to gray level differences A to I so as to be linear with A to I.

Figure 13:
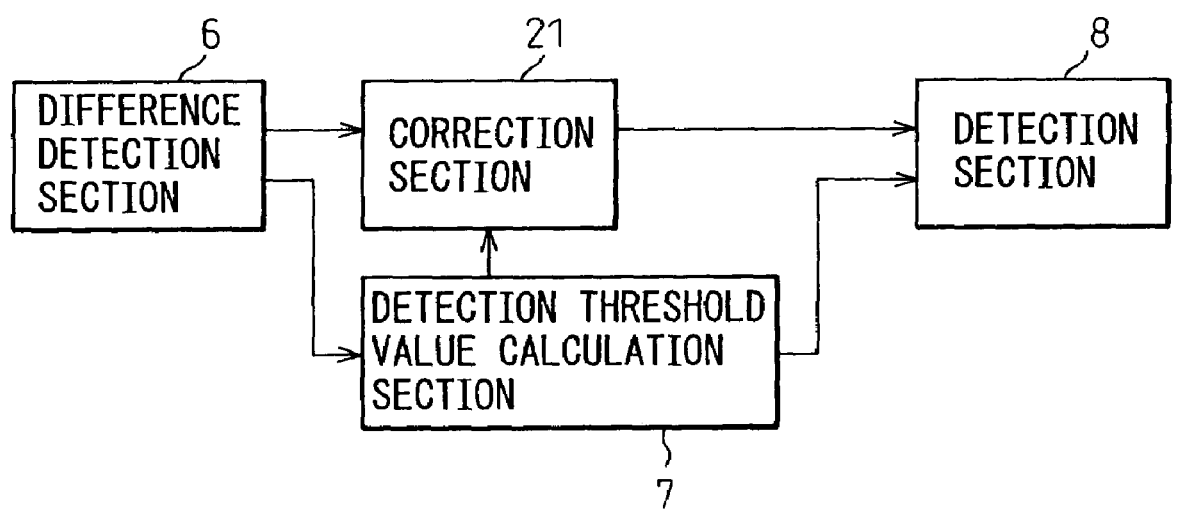
FIG. 13 is a block diagram that shows the general configuration of a semiconductor pattern appearance inspection apparatus according to a fourth embodiment of the present invention.

FIG. 13 is a diagram that shows the configuration of the part after the difference detection section 6 of the appearance inspection apparatus in the fourth embodiment of the present invention. The appearance inspection apparatus in the fourth embodiment has a configuration similar to that in the third embodiment, but differs in that a correction section 21 is provided. As in the third embodiment, the difference detection section 6 detects positive- or negative-signed gray level differences and outputs them to the detection threshold value calculation section 7 and the correction section 21. The detection threshold value calculation section 7 determines two positive and negative threshold values Th (+) and TH (−) from the signed gray level differences, and outputs (Th (+)−TH (−))/2 to the detection section 8 as a threshold value. The detection threshold value calculation section 7 calculates the average (Th (+)−TH (−))/2 of the positive and negative threshold values Th (+) and TH (−), and outputs it to the correction section 21 as a correction value. The correction section 21 calculates signed corrected gray level differences by subtracting the correction value from the signed gray level differences, converts them into absolute-values, and outputs them to the detection section 8. The detection section 8 judges the absolute-value corrected gray level differences without sign using (Th (+)−TH (−))/2 as a threshold value.

It is effective to determine two positive and negative threshold values, calculate a threshold value and absolute-value corrected gray level differences from them, and compare them as shown in the fourth embodiment not only in the case of the fourth embodiment where a threshold value is not determined by calculating the converted cumulative frequencies and a straight line approximation in the detection threshold value calculation section 7 but also in a case where a threshold value is determined by another method, for example, where a threshold value is determined without inverse conversion from a histogram.

In the first to fourth embodiments, the process is done with the assumption that the gray level differences are represented by a certain distribution. However, if the assumed distribution is not suitable, it is not possible to set a proper threshold value. This problem will be solved in the following embodiment.

The fifth embodiment of the present invention has a configuration in which the process in the detection threshold value calculation section 7 in the first embodiment has been modified, and differs from the first embodiment in that correlation degrees are calculated when plural types of distributions are applied and a distribution having the highest correlation degree is used.

Figure 14:
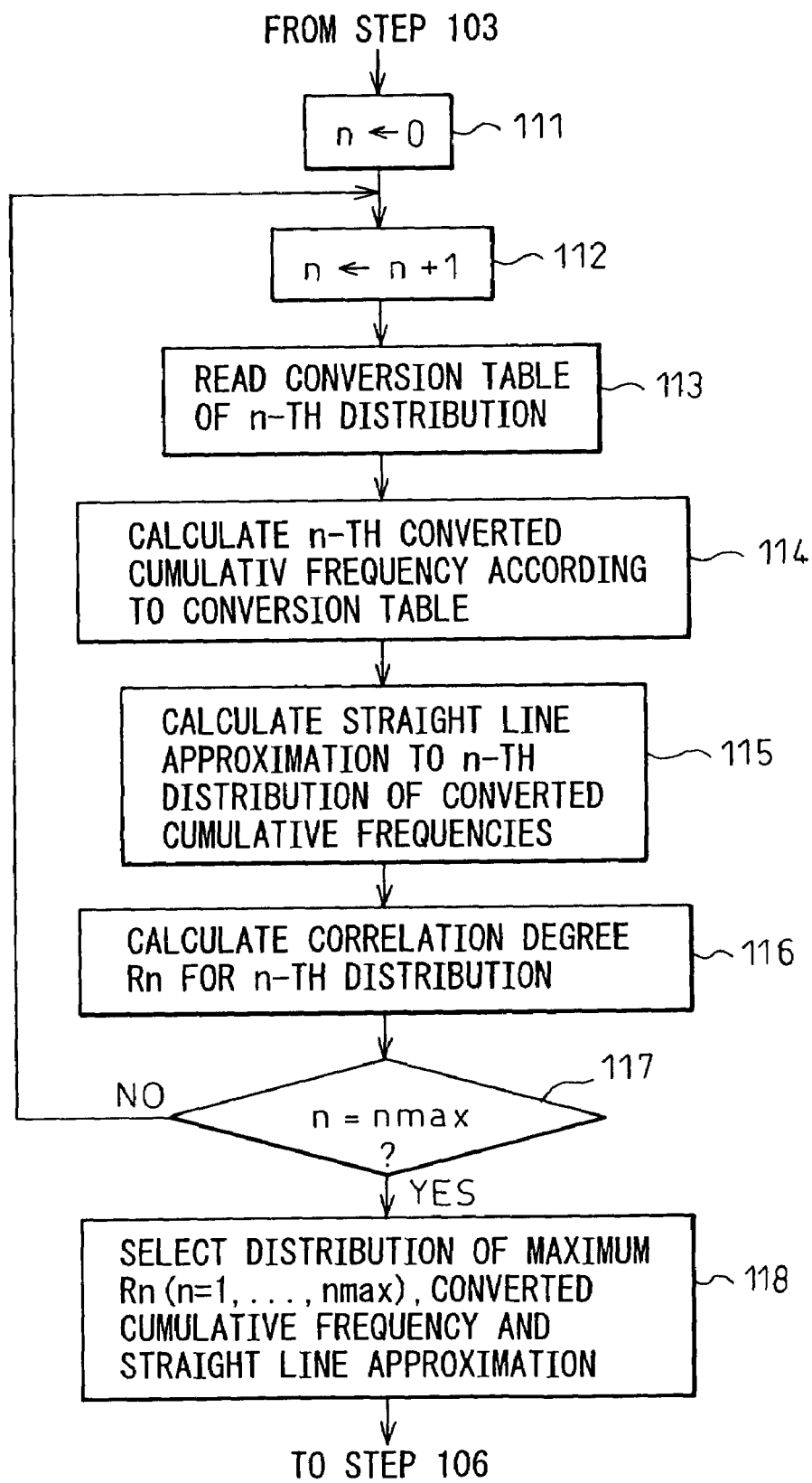
FIG. 14 is a flow chart that shows a process for determining a detection threshold value in a fifth embodiment of the present invention.

FIG. 14 is a flow chart that shows the process in the detection threshold value calculation section 7 in the fifth embodiment. As shown in FIG. 14, the processes until step 103, in which the cumulative frequency is created, are the same as the first embodiment. In step 111, zero is substituted for a variable n, and in step 112 n is increased by one. In step 113, the conversion table of the n-th distribution is read. As described in the first embodiment, the conversion table is prepared in advance in accordance with each distribution and conversion is made using it, because it requires an enormous amount of calculation to obtain an inverse of the cumulative probability function. It is assumed here, for example, that the conversion tables for a normal distribution, a Poisson distribution, a t distribution, an exponential distribution, a Weibull distribution and a chi-square distribution are stored in order, but the present invention is not limited to those and a conversion table for any distribution can be stored. When an inverse of the cumulative probability function is obtained without a conversion table, an expression for calculation of each distribution is read.

In step 114, according to the read conversion table, the n-th converted cumulative frequency is calculated. In step 115, a straight line approximation to the converted cumulative frequencies of the n-th distribution is calculated. In step 116, the correlation degree Rn for the n-th distribution is calculated from the difference between the converted cumulative frequencies of the n-th distribution and the straight line approximation. In step 117, whether n coincides with nmax (here, nmax=6) is judged and when not, step 112 is resumed and steps 112 to 117 are repeated until n coincides with nmax. In this manner, the converted cumulative frequency, the straight line approximation and the correlation degree are calculated for the n types of distributions. In step 118, the distribution having the highest correlation degree of the n types of distributions, the converted cumulative frequency and the straight line approximation are selected. After this, in step 106 in FIG. 3, a detection threshold value is determined in the same manner as in the first embodiment according to the selected distribution, the converted cumulative frequency and the straight line approximation.

The process in the fifth embodiment is described as above. The process in the fifth embodiment can be applied to the second to fourth embodiments.

Figure 15:
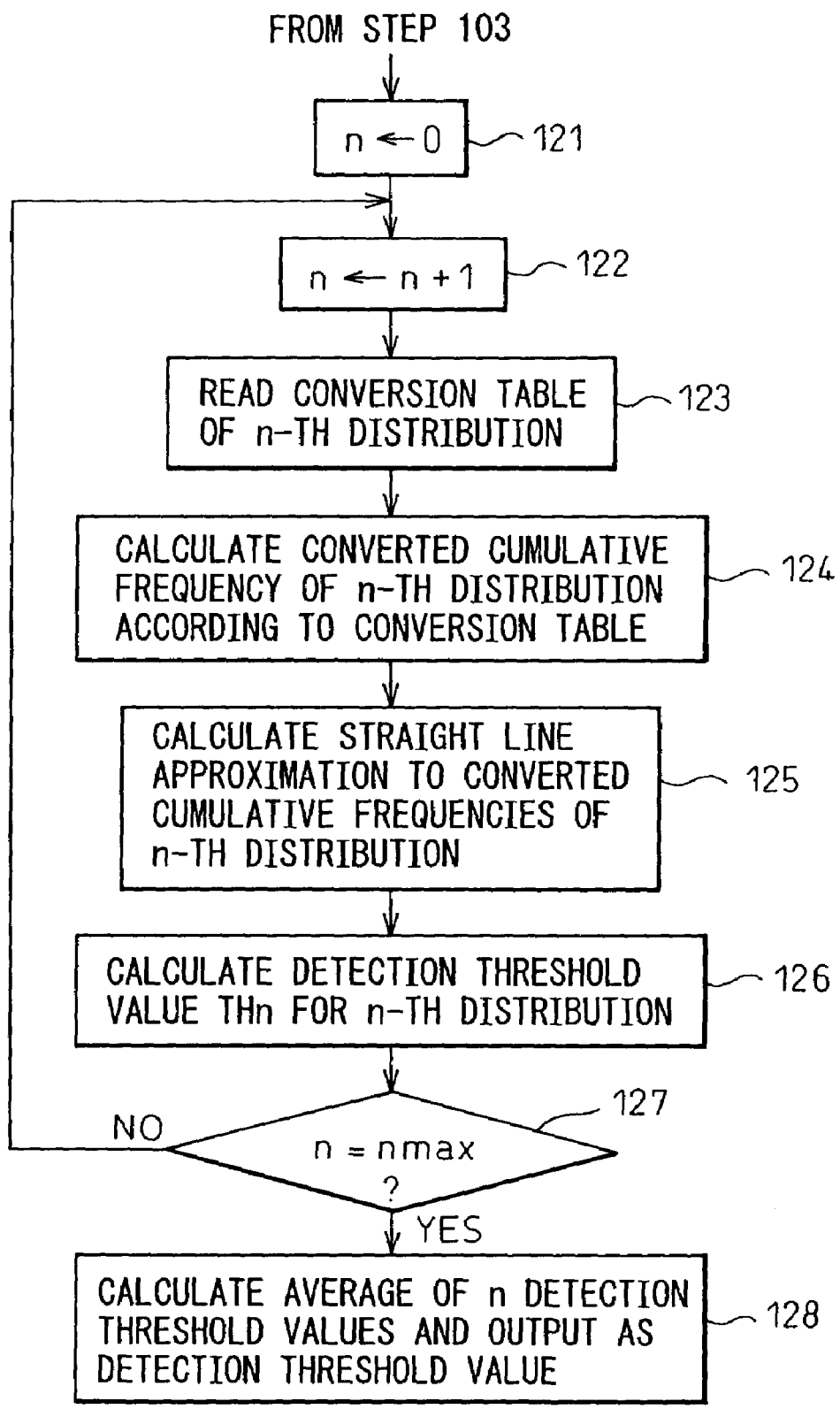
FIG. 15 is a flow chart that shows a process for determining a detection threshold value in a sixth embodiment of the present invention.

FIG. 15 is a flow chart that shows the process in the detection threshold value calculation section 7 in the sixth embodiment of the present invention. The sixth embodiment has a configuration in which the process in the detection threshold value calculation section 7 in the first embodiment has been modified as in the fifth embodiment, and differs from the first embodiment in that threshold values, when plural types of distributions are applied, are calculated, respectively, and a detection threshold value is determined from the average of them.

As shown in FIG. 15, steps 121 to 125 in the sixth embodiment are the same as steps 111 to 125 in the fifth embodiment. In step 126, a threshold value THn is calculated for the n-th distribution. In step 127, whether n coincides with nmax is judged, and when not, step 122 is resumed and steps 122 to 127 are repeated until n coincides with nmax. In this manner, threshold values for the n types of distributions are calculated. In step 128, the average of the detection threshold values for the n types of distributions are calculated and output as a detection threshold value.

The process in the sixth embodiment can also be applied to the second to fourth embodiments.

Figure 16:
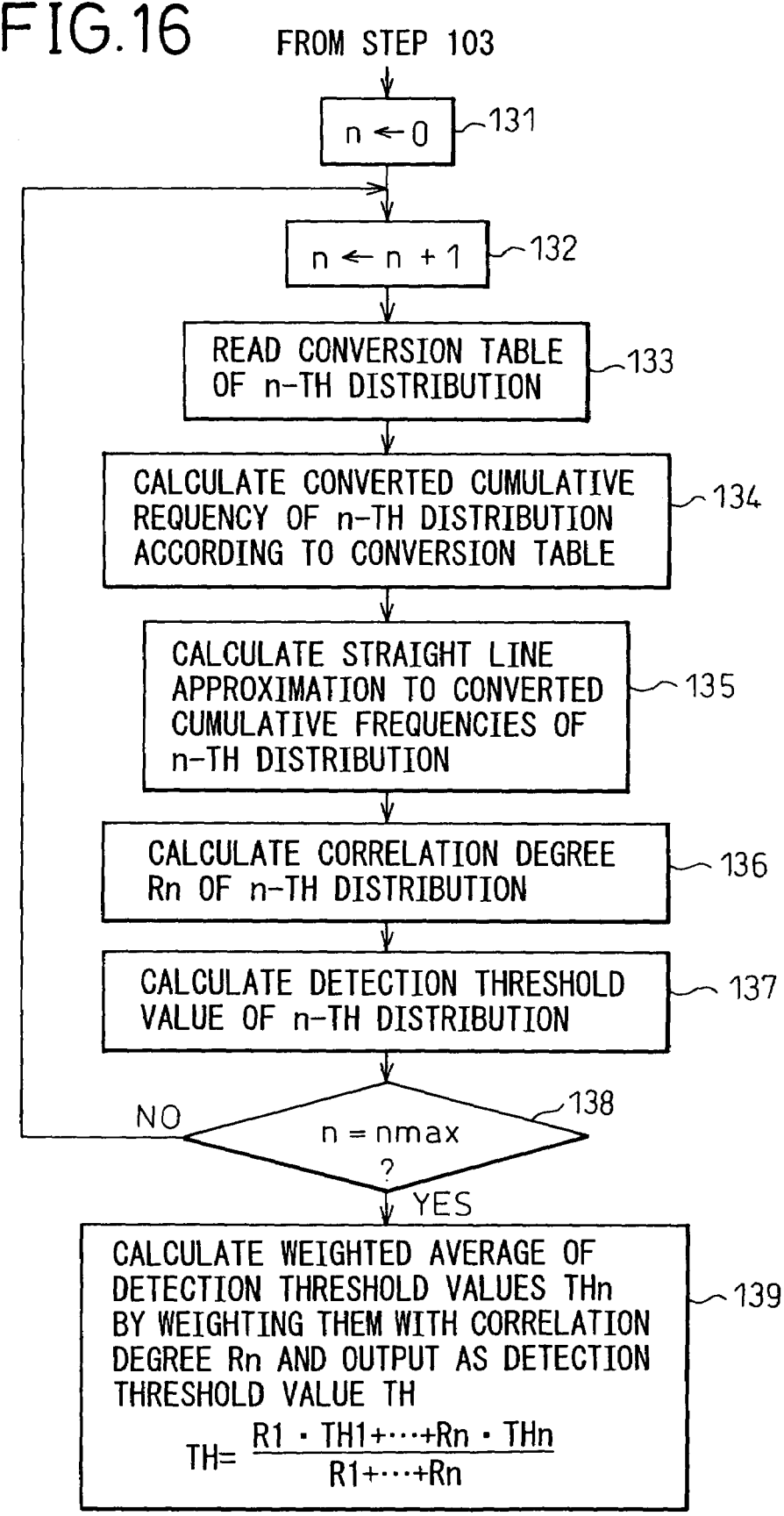
FIG. 16 is a flow chart that shows a process for determining a detection threshold value in a seventh embodiment of the present invention.

FIG. 16 is a flow chart that shows the process in the detection threshold value calculation section 7 in the seventh embodiment of the present invention. The seventh embodiment has a configuration in which the process in the detection threshold value calculation section 7 in the first embodiment has been modified as in the fifth embodiment, and differs from the first embodiment in that correlation degrees and detection threshold values, when plural types of distributions are applied, are calculated, respectively, and a detection threshold value is calculated from a weighted average of the detection threshold values weighted by the correlation degrees.

As shown in FIG. 16, steps 131 to 136 in the seventh embodiment are the same as steps 111 to 126 in the fifth embodiment. In step 137, a detection threshold value THn for the n-th distribution is calculated. In step 137, whether n coincides with nmax is judged and when not, step 132 is resumed and steps 132 to 138 are repeated until n coincides with nmax. In this manner detection threshold values for the n types of distributions are calculated. In step 118, a weighted average of detection threshold values THn is calculated by weighting them with the correlation degrees Rn for the n types of distributions, and is output as a detection threshold value TH.

The process in the seventh embodiment can also be applied to the second to fourth embodiments.

As described above, according to the present invention, it is possible to realize an image defect inspection method and an image defect inspection apparatus capable of setting a threshold value in accordance with an image both in a brief time and at a low cost, because a threshold value in accordance with the noise level of an image can be set in a simplified process. Moreover, if the method and apparatus are used, it is possible to realize a low cost appearance inspection apparatus with a high throughput capable of automatically setting a threshold value and detecting a defect in a more proper manner.

I claim:

1. An image defect inspection method for detecting a gray level difference between the corresponding parts of two images, comparing the detected gray level difference with a threshold value, and judging the part to be a defect when the gray level difference is larger than the threshold value,
wherein cumulative frequencies of the calculated gray level differences are calculated,
wherein converted cumulative frequencies are calculated by converting the cumulative frequencies so as to be linear with the gray level differences in a predetermined distribution with which the gray level differences are assumed to be distributed,
wherein a straight line approximation is calculated by approximating the converted cumulative frequencies to a straight line,
wherein a threshold value is determined from a predetermined cumulative frequency based on the calculated straight line approximation according to a predetermined calculation method, and
wherein a comparison is made according to the determined threshold value.

2. An image defect inspection method, as set forth in claim 1, wherein the conversion of the cumulative frequencies into the converted cumulative frequencies is carried out by using a conversion table.

3. An image defect inspection method, as set forth in claim 1, wherein the cumulative frequencies are calculated from the sampled gray level differences.

4. An image defect inspection method, as set forth in claim 1, wherein the threshold value is a gray level difference corresponding to the value of the predetermined cumulative frequency on the straight line approximation plus a predetermined gray level difference.

5. An image defect inspection method, as set forth in claim 1, wherein the gray level differences are positive- or negative-signed data,
wherein the cumulative frequencies are calculated from the signed corrected gray level differences, and
wherein before the threshold value is determined, two threshold values for the positive and negative areas are determined.

6. An image defect inspection method, as set forth in claim 1, wherein the gray level differences are positive- or negative-signed data,
wherein the average of the signed gray level differences is calculated,
wherein positive- or negative-signed corrected gray level differences are calculated by correcting the gray level differences with the calculated average,
wherein absolute-value corrected gray level differences without sign are calculated from the signed corrected gray level differences,
wherein the cumulative frequencies are calculated from the absolute-value corrected gray level differences, and
wherein when a comparison with the determined threshold value is made, the absolute-value corrected gray level differences are compared with the threshold value.

7. An image defect inspection method, as set forth in claim 1, wherein the gray level differences are positive- or negative-signed data,
wherein the cumulative frequencies are calculated from the signed corrected gray level differences,
wherein after two threshold values are determined for the positive and negative areas, the threshold value is determined as a corrected threshold value, which is half of the difference between the two threshold values for the positive and negative areas, and
wherein when a comparison is made, the absolute-value corrected gray level differences, which are the gray level differences corrected with the average of the two positive and negative threshold values, are compared with the threshold value.

8. An image defect inspection method, as set forth in claim 1, wherein correlation degrees of the gray level differences for plural types of distributions are calculated, respectively, and
wherein the threshold value determined from the distribution having the highest correlation degree is used.

9. An image defect inspection method, as set forth in claim 8, wherein the correlation degree is calculated from the difference between the converted cumulative frequencies and the straight line approximations after calculating the converted cumulative frequencies and the straight line approximations for the plural types of distributions, respectively.

10. An image defect inspection method, as set forth in claim 1, wherein plural individual threshold values are calculated for plural types of distributions, respectively, and
wherein the threshold value is determined as the average of the plural individual threshold values.

11. An image defect inspection method, as set forth in claim 1, wherein plural correlation degrees and plural individual threshold values of the gray level differences for plural types of distributions are calculated, respectively, and
wherein the threshold value is determined as the weighted average of the plural individual threshold values weighted by the plural correlation degrees.

12. An image defect inspection method, as set forth in claim 1, wherein the predetermined distribution is any one of a normal distribution, a Poisson distribution, at distribution, an exponential distribution, a Weibull distribution, or a chi-square distribution.

13. An image defect inspection method, as set forth in claim 1, wherein the determination of the threshold value is made automatically.

14. An image defect inspection apparatus comprising:
a difference image detection section for detecting a gray level difference between the corresponding parts of two images;
a defect detection section for comparing the detected gray level difference with a threshold vale and judging the part to be a defect when the gray level difference is larger than the threshold value; and
a detection threshold value calculation section for changing the threshold value in accordance with the distribution of detected gray level differences,
wherein the detection threshold value calculation section comprises:
a cumulative frequency calculation section for calculating cumulative frequencies of the calculated gray level difference;
a conversion section for calculating converted cumulative frequencies by converting the cumulative frequencies so as to be linear with the gray level differences in a predetermined distribution with which the gray level differences are assumed to be distributed;
a straight line approximation calculation section for calculating a straight line approximation by approximating the converted cumulative frequencies to a straight line; and
a threshold value determination section for determining a threshold value from the value of a predetermined cumulative frequency based on the calculated straight line approximation according to a predetermined calculation method, and wherein a comparison is made according to the determined threshold value.

15. An image defect inspection apparatus, as set forth in claim 14, wherein the conversion section comprises a conversion table used to convert the cumulative frequencies into the converted cumulative frequencies.

16. An image defect inspection apparatus, as set forth in claim 14, wherein the cumulative frequency calculation section calculates the cumulative frequencies from the sampled gray level differences.

17. An image defect inspection apparatus, as set forth in claim 14, wherein the threshold value determination section determines a threshold value as a gray level difference of the point corresponding to the value of the predetermined cumulative frequency on the straight line approximation plus a predetermined gray level difference.

18. An image defect inspection apparatus, as set forth in claim 14, wherein the difference image detection section detects positive- or negative-signed gray level differences, wherein the cumulative frequency calculation section calculates cumulative frequencies of the signed gray level differences, and wherein the threshold value determination section calculates two threshold values for the positive and negative areas.

19. An image defect inspection apparatus, as set forth in claim 14, wherein the difference image detection section detects positive- or negative-signed gray level differences, wherein said apparatus further comprises: an average calculation section for calculating the average of the signed gray level differences; a correction section for calculating positive- or negative-singed corrected gray level differences by correcting the signed gray level differences with the calculated average; and an absolute-value conversion section for calculating absolute-value corrected gray level differences without sign from the signed corrected gray level differences, and wherein the detection threshold value calculation section and the defect detection section carry out operations based on the absolute-value corrected gray level differences output from the absolute-value conversion section.

20. An image defect inspection apparatus, as set forth in claim 14, wherein the difference image detection section detects positive- or negative-signed gray level differences, wherein the cumulative frequency calculation section calculates cumulative frequency of the signed gray level differences, wherein the threshold value determination section first calculates two threshold values for the positive and negative areas then determines half of the difference between the two positive and negative values for the positive and negative areas as a corrected threshold value, wherein said apparatus further comprises an average operation section for calculating the average of the two positive and negative threshold values, wherein the image defect detection apparatus further comprises a correction section for calculating absolute-value corrected gray level differences by correcting the signed gray level differences with the average of the two positive and negative threshold values, and wherein the detection threshold value calculation section and the detection section carry out operations based on the absolute-value corrected gray level differences output from the correction section.

21. An image defect inspection apparatus, as set forth in claim 14, wherein the detection threshold value calculation section further comprises a correlation degree calculation section for calculating correlation degrees of the gray level differences for plural types of distributions, respectively, and wherein the detection threshold value calculation section determines the threshold value from the distribution having the highest correlation degree.

22. Am image defect inspection apparatus, as set forth in claim 14, wherein the conversion section and the straight line approximation calculation section of the detection threshold value calculation section calculate the plural converted cumulative frequencies and the plural straight line approximations for plural types of distributions, respectively, wherein the detection threshold value calculation section further comprises a correlation degree calculation section for calculating correlation degrees of the gray level differences for the plural types of distributions from the difference between the plural converted cumulative frequencies and the plural straight line approximations, respectively, and wherein the threshold value determination section of the detection threshold value calculation section determines a threshold value based on the straight line approximation having the highest correlation degree.

23. An image defect inspection apparatus, as set forth in claim 14, wherein the detection threshold value calculation section calculates plural individual threshold values for plural types of distributions, respectively, wherein said apparatus further comprises a threshold value average calculation section for calculating the average of the plural individual threshold values, respectively, and wherein the threshold value determination section determines the average of the plural individual threshold values calculated by the threshold value average calculation section as the threshold value.

24. An image defect inspection apparatus, as set forth in claim 14, wherein the detection threshold value calculation section determines the threshold values for plural types of distributions, respectively, wherein the detection threshold value calculation section further comprises a correlation degree calculation section for calculating correlation degrees of the gray level differences for plural types of distributions, respectively, and a weighted average threshold value calculation section for calculating the weighted average of the plural individual threshold values by weighting them with the plural correlation degrees, and wherein the weighted average calculated by the weighted average threshold value calculation section is determined as the threshold value.

25. An image defect inspection apparatus, as set forth in claim 14, wherein the conversion section carries out a conversion using any one of a normal distribution, a Poisson distribution, a t distribution, an exponential distribution, a Weibull distribution, or a chi-square distribution as the fixed distributions.

26. An appearance inspection apparatus for detecting a defect of a semiconductor circuit pattern formed on a semiconductor wafer, comprising an image pickup means for generating the image of the semiconductor circuit pattern on the semiconductor wafer and the image defect inspection apparatus set forth in claim 14, wherein the image defect inspection apparatus detects a defect of the semiconductor circuit patter.

27. An image defect inspection method for detecting a gray level difference between the corresponding parts of two images, comparing the detected gray level difference with a threshold value, and judging the part to be a defect when the gray level difference is larger than the threshold value,
- wherein the gray level differences are positive- or negative-signed data,
- wherein the average of the signed gray level differences is calculated,
- wherein signed corrected gray level differences are calculated by correcting the gray level differences with the calculated average,
- wherein absolute-value corrected gray level differences without sign are calculated from the signed corrected gray level differences, and
- wherein the absolute-value corrected gray level differences are compared with the threshold value.

28. An image defect inspection method for detecting a gray level difference between the corresponding parts of two images, comprising the detected gray level difference with a threshold value, and judging the part to be a defect when the gray level difference is larger than the threshold value,
- wherein the gray level differences are positive- or negative-signed data,
- wherein positive and negative cumulative frequencies are calculated from the gray level differences,
- wherein two threshold values are determined for the positive and negative areas from the cumulative frequencies according to a predetermined calculation method and half of the difference between the two positive and negative threshold values is determined as a corrected threshold value,
- wherein absolute-value corrected gray level differences are calculated by correcting the gray level differences with the average of the two positive and negative threshold values,
- wherein an absolute-value threshold value is calculated from the two positive and negative threshold values, and
- wherein the absolute-value corrected gray level differences are compared with the absolute-value threshold value.

29. An image defect inspection apparatus comprising:
- a difference image detection section for detecting a gray level difference between the corresponding parts of two images; and
- a defect detection section for comparing the detected gray level difference with a threshold value and judging the part to be a defect when the gray level difference is larger than the threshold value,
- wherein the difference image detection section detects positive- or negative-signed gray level differences,
- wherein said apparatus comprises: a cumulative frequency calculation section for calculating positive and negative cumulative frequencies from the gray level differences; a threshold value determination section for determining two threshold values for the positive and the negative areas from the cumulative frequencies according to a predetermined calculation method; a corrected threshold value determination section for determining a corrected threshold value by calculating half of the difference between the two positive and negative threshold values; an absolute-value corrected gray level calculation section for calculating absolute-value corrected gray level differences by correcting the gray level differences with the average of the two positive and negative threshold values; and an absolute-value threshold value calculation section for calculating an absolute-value threshold value from the two positive and negative threshold values, and
- wherein the defect detection section compares the absolute-value corrected gray level differences with the absolute-value threshold value.

* * * * *

UNITED STATES PATENT AND TRADEMARK OFFICE
CERTIFICATE OF CORRECTION

PATENT NO. : 7,330,581 B2  Page 1 of 1
APPLICATION NO. : 10/674654
DATED : February 12, 2008
INVENTOR(S) : Akio Ishikawa It is certified that error appears in the above-identified patent and that said Letters Patent is hereby corrected as shown below:

Column 16, line 35, Claim 12    Delete "at";
                                Insert --a t--

Column 16, line 46, Claim 14    Delete "vale",
                                Insert --value--

Column 17, line 35, Claim 19    Delete "negative-singed",
                                Insert --negative-signed--

Column 19, line 3, Claim 26     Delete "patter",
                                Insert --pattern--

Signed and Sealed this

Second Day of December, 2008

JON W. DUDAS
*Director of the United States Patent and Trademark Office*